United States Patent
Kim et al.

(10) Patent No.: US 12,349,048 B2
(45) Date of Patent: Jul. 1, 2025

(54) APPLICATION CLIENT AND EDGE APPLICATION SERVER DISCOVERY WITH SERVICE AUTHORIZATION AND LOCATION SERVICE

(71) Applicant: QUALCOMM Incorporated, San Diego, CA (US)

(72) Inventors: Sunghoon Kim, San Diego, CA (US); Dario Serafino Tonesi, San Diego, CA (US); Alan Soloway, Frederick, CO (US); Ajith Tom Payyappilly, San Diego, CA (US); Tom Chin, San Diego, CA (US); Robert Thomas Franzo, Northport, MI (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/645,888

(22) Filed: Apr. 25, 2024

(65) Prior Publication Data

US 2024/0276356 A1    Aug. 15, 2024

Related U.S. Application Data

(63) Continuation of application No. 17/445,177, filed on Aug. 16, 2021, now Pat. No. 11,997,590.

(51) Int. Cl.
*H04W 48/16* (2009.01)
*H04W 60/00* (2009.01)

(52) U.S. Cl.
CPC .......... *H04W 48/16* (2013.01); *H04W 60/00* (2013.01)

(58) Field of Classification Search
CPC ............................ H04W 48/16; H04W 60/00
See application file for complete search history.

(56) References Cited

U.S. PATENT DOCUMENTS

| | | | |
|---|---|---|---|
| 11,277,305 B2 * | 3/2022 | Hall | ........................ H04L 41/12 |
| 2021/0075892 A1 | 3/2021 | Chun | |
| 2023/0047503 A1 | 2/2023 | Kim et al. | |

FOREIGN PATENT DOCUMENTS

| | | |
|---|---|---|
| KR | 20200130043 A | 11/2020 |
| WO | 2020231120 A1 | 11/2020 |
| WO | 2021138309 A1 | 7/2021 |

OTHER PUBLICATIONS

International Search Report and Written Opinion—PCT/US2022/073535—ISA/EPO—Dec. 12, 2022.

(Continued)

*Primary Examiner* — Diane D Mizrahi
(74) *Attorney, Agent, or Firm* — Harrity & Harrity, LLP

(57) ABSTRACT

Various aspects of the present disclosure generally relate to wireless communication. In some aspects, a user equipment (UE) may receive a first edge application server (EAS) discovery message from an application client that is external to the UE. The UE may transmit a second EAS discovery message to an edge enabler server (EES) based at least in part on the first EAS discovery message. The UE may receive, from the EES, an EAS response message. The EAS response message may indicate a failure of a discovery request associated with the application client or the EAS response message may indicate an EAS associated with the application client. The UE may transmit an indication of the failure of the discovery request or an indication of the EAS to the application client. Numerous other aspects are described.

20 Claims, 17 Drawing Sheets

(56) References Cited

OTHER PUBLICATIONS

Partial International Search Report—PCT/US2022/073535—ISA/EPO—Oct. 21, 2022.
Qualcomm Incorporated: "Pseudo-CR on UE—Edge Application Context Transfer", 3GPP TSG-SA WG6 Meeting #37-e, S6-200679, 3rd Generation Partnership Project (3GPP), Mobile Competence Centre, 650, Route Des Lucioles, F-06921 Sophia-Antipolis Cedex, France, vol. SA WG6, No. Online, Meeting, May 14, 2020-May 26, 2020, May 7, 2020, XP051881393, 6 Pages, the whole document.
Samsung: "Application Context Relocation Initiated by EEC", 3GPP TSG-SA WG6 Meeting #38-e, S6-201055, 3rd Generation Partnership Project (3GPP), Mobile Competence Centre, 650, Route Des Lucioles, F-06921 Sophia-Antipolis Cedex, France, vol. SA WG6, No. e-meeting, Jul. 20, 2020-Jul. 31, 2020, Jul. 15, 2020, XP051908825, 4 Pages, the whole document.

* cited by examiner

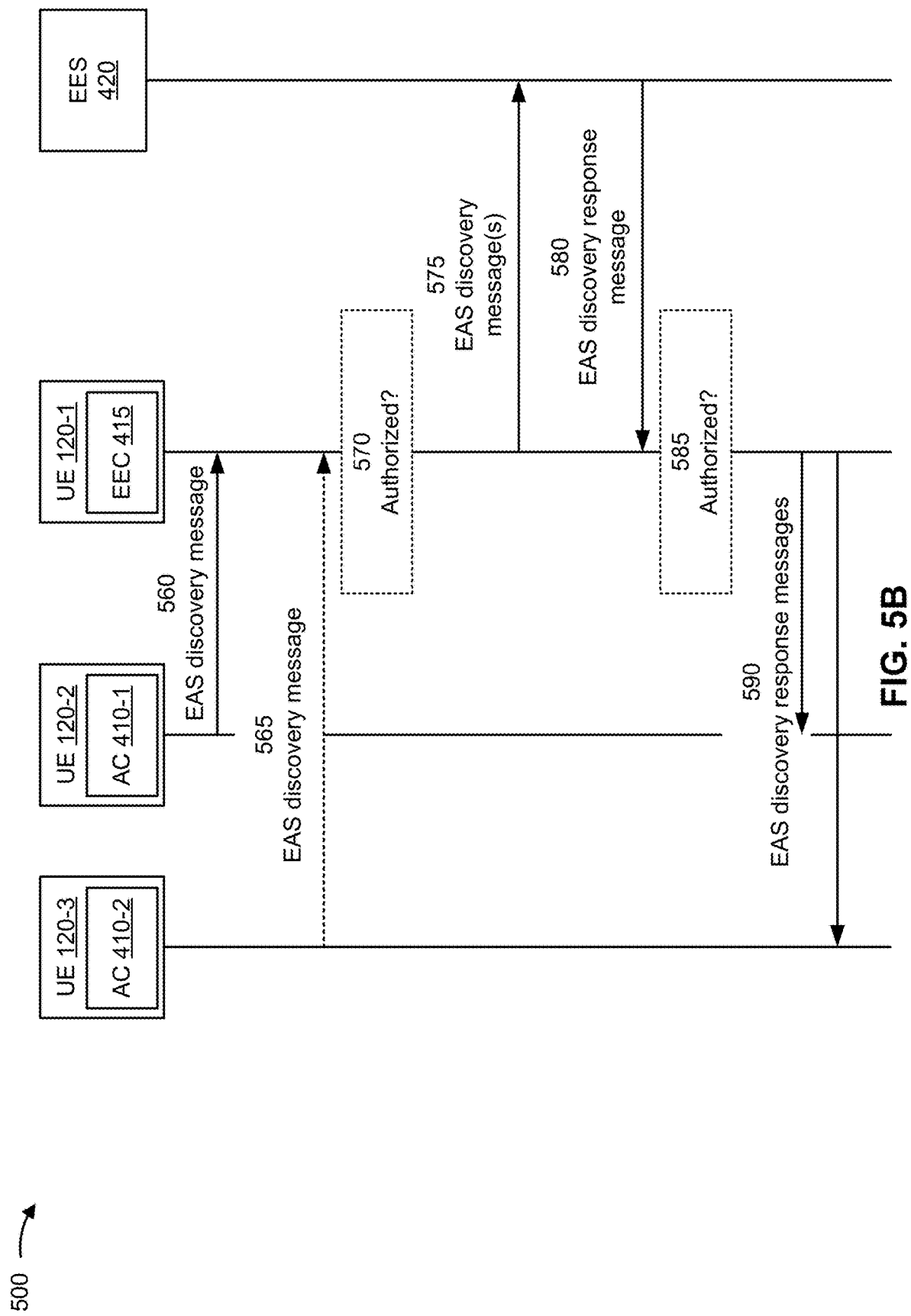

US 12,349,048 B2

APPLICATION CLIENT AND EDGE APPLICATION SERVER DISCOVERY WITH SERVICE AUTHORIZATION AND LOCATION SERVICE

RELATED APPLICATION

This application is a continuation of U.S. patent application Ser. No. 17/445,177, filed Aug. 16, 2021, which is incorporated herein by reference in its entirety.

FIELD OF THE DISCLOSURE

Aspects of the present disclosure generally relate to wireless communication and to techniques and apparatuses for application client (AC) and edge application server (EAS) discovery with service authorization and location service.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a first edge application server (EAS) discovery message from an application client that is external to the UE. The method may include transmitting a second EAS discovery message to an edge enabler server (EES) based at least in part on the first EAS discovery message. The method may include receiving, from the EES, an EAS response message, wherein the EAS response message indicates a failure of a discovery request associated with the application client or the EAS response message indicates an EAS associated with the application client. The method may include transmitting an indication of the failure of the discovery request or an indication of the EAS to the application client.

Some aspects described herein relate to a method of wireless communication performed by a UE. The method may include receiving, by an edge enabler client (EEC) of the UE, an edge application client (EAC) registration message from an application client that is external to the UE, wherein the EAC registration message from the application client indicates a device identifier associated with the application client. The method may include transmitting a response to the application client, wherein the response indicates a result of the application client registering with the EEC, wherein the result is based at least in part on whether a list of devices indicates that the device identifier is associated with an authorized application client or an unauthorized application client.

Some aspects described herein relate to a method of wireless communication performed by a UE. The method may include receiving, by an EEC of the UE and from a first application client, an EAC discovery request message, wherein the first application client is external to the UE. The method may include transmitting an EAC discovery response message to the first application client, wherein the EAC discovery response message indicates a second application client to enable the first application client to communicate with the second application client.

Some aspects described herein relate to a method of wireless communication performed by an apparatus of a wireless node. The method may include receiving, from an EEC of a UE, an address of an application client connected to the EEC, wherein the application client is included in a device that is external to the UE. The method may include receiving, from an EAS, a request for location information associated with the address of the application client. The method may include transmitting, to the EAS, a response to the request, wherein the response indicates a location of the EEC based at least in part on the application client being connected to the EEC.

Some aspects described herein relate to a UE for wireless communication. The UE may include a memory and one or more processors coupled to the memory. The one or more processors may be configured to receive a first EAS discovery message from an application client that is external to the UE. The one or more processors may be configured to transmit a second EAS discovery message to EES based at least in part on the first EAS discovery message. The one or more processors may be configured to receive, from the EES, an EAS response message, wherein the EAS response message indicates a failure of a discovery request associated with the application client or the EAS response message indicates an EAS associated with the application client. The one or more processors may be configured to transmit an indication of the failure of the discovery request or an indication of the EAS to the application client.

Some aspects described herein relate to a UE for wireless communication. The UE may include a memory and one or more processors coupled to the memory. The one or more processors may be configured to receive an EAC registration message from an application client that is external to the UE, wherein the EAC registration message from the application client indicates a device identifier associated with the application client. The one or more processors may be configured to transmit a response to the application client, wherein the response indicates a result of the application client registering with the EEC, wherein the result is based at least in part on whether a list of devices indicates that the device identifier is associated with an authorized application client or an unauthorized application client.

Some aspects described herein relate to a UE for wireless communication. The UE may include a memory and one or more processors coupled to the memory. The one or more processors may be configured to receive, from a first application client, an EAC discovery request message, wherein the first application client is external to the UE. The one or more processors may be configured to transmit an EAC discovery response message to the first application client, wherein the EAC discovery response message indicates a second application client to enable the first application client to communicate with the second application client.

Some aspects described herein relate to an apparatus of a wireless node for wireless communication. The apparatus of a wireless node may include a memory and one or more processors coupled to the memory. The one or more processors may be configured to receive, from an EEC of a UE, an address of an application client connected to the EEC, wherein the application client is included in a device that is external to the UE. The one or more processors may be configured to receive, from an EAS, a request for location information associated with the address of the application client. The one or more processors may be configured to transmit, to the EAS, a response to the request, wherein the response indicates a location of the EEC based at least in part on the application client being connected to the EEC.

Some aspects described herein relate to a non-transitory computer-readable medium that stores a set of instructions for wireless communication that, when executed by one or more processors of a UE, may cause the UE to receive a first EAS discovery message from an application client that is external to the UE. The set of instructions, when executed by one or more processors of the UE, may cause the UE to transmit a second EAS discovery message to an EES based at least in part on the first EAS discovery message. The set of instructions, when executed by one or more processors of the UE, may cause the UE to receive, from the EES, an EAS response message, wherein the EAS response message indicates a failure of a discovery request associated with the application client or the EAS response message indicates an EAS associated with the application client. The set of instructions, when executed by one or more processors of the UE, may cause the UE to transmit an indication of the failure of the discovery request or an indication of the EAS to the application client.

Some aspects described herein relate to a non-transitory computer-readable medium that stores a set of instructions that, when executed by one or more processors of a UE, may cause the UE to receive an EAC registration message from an application client that is external to the UE, wherein the EAC registration message from the application client indicates a device identifier associated with the application client. The set of instructions, when executed by one or more processors of the UE, may cause the UE to transmit a response to the application client, wherein the response indicates a result of the application client registering with the EEC, wherein the result is based at least in part on whether a list of devices indicates that the device identifier is associated with an authorized application client or an unauthorized application client.

Some aspects described herein relate to a non-transitory computer-readable medium that stores a set of instructions that, when executed by one or more processors of a UE, may cause the UE to receive, from a first application client, an EAC discovery request message, wherein the first application client is external to the UE. The set of instructions, when executed by one or more processors of the UE, may cause the UE to transmit an EAC discovery response message to the first application client, wherein the EAC discovery response message indicates a second application client to enable the first application client to communicate with the second application client.

Some aspects described herein relate to a non-transitory computer-readable medium that stores a set of instructions for wireless communication by a wireless node. The set of instructions, when executed by one or more processors of the wireless node, may cause the wireless node to receive, from an EEC of a UE, an address of an application client connected to the EEC, wherein the application client is included in a device that is external to the UE. The set of instructions, when executed by one or more processors of the wireless node, may cause the wireless node to receive, from an EAS, a request for location information associated with the address of the application client. The set of instructions, when executed by one or more processors of the wireless node, may cause the wireless node to transmit, to the EAS, a response to the request, wherein the response indicates a location of the EEC based at least in part on the application client being connected to the EEC.

Some aspects described herein relate to an apparatus of a UE for wireless communication. The apparatus may include means for receiving a first EAS discovery message from an application client that is external to the UE. The apparatus may include means for transmitting a second EAS discovery message to an EES based at least in part on the first EAS discovery message. The apparatus may include means for receiving, from the EES, an EAS response message, wherein the EAS response message indicates a failure of a discovery request associated with the application client or the EAS response message indicates an EAS associated with the application client. The apparatus may include means for transmitting an indication of the failure of the discovery request or an indication of the EAS to the application client.

Some aspects described herein relate to an apparatus of a UE for wireless communication. The apparatus may include means for receiving an EAC registration message from an application client that is external to the UE, wherein the EAC registration message from the application client indicates a device identifier associated with the application client. The apparatus may include means for transmitting a response to the application client, wherein the response indicates a result of the application client registering with the EEC, wherein the result is based at least in part on whether a list of devices indicates that the device identifier is associated with an authorized application client or an unauthorized application client.

Some aspects described herein relate to an apparatus of a UE for wireless communication. The apparatus may include means for receiving, from a first application client, an EAC discovery request message, wherein the first application client is external to the UE. The apparatus may include means for transmitting an EAC discovery response message to the first application client, wherein the EAC discovery response message indicates a second application client to enable the first application client to communicate with the second application client.

Some aspects described herein relate to an apparatus of a wireless node for wireless communication. The apparatus may include means for receiving, from an EEC of a UE, an address of an application client connected to the EEC, wherein the application client is included in a device that is external to the UE. The apparatus may include means for receiving, from an EAS, a request for location information associated with the address of the application client. The apparatus may include means for transmitting, to the EAS, a response to the request, wherein the response indicates a location of the EEC based at least in part on the application client being connected to the EEC.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antennas, RF-chains, power amplifiers, modulators, buffers, processors, interleavers, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A and 5B are diagrams illustrating an example associated with EAS registration with service authorization, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
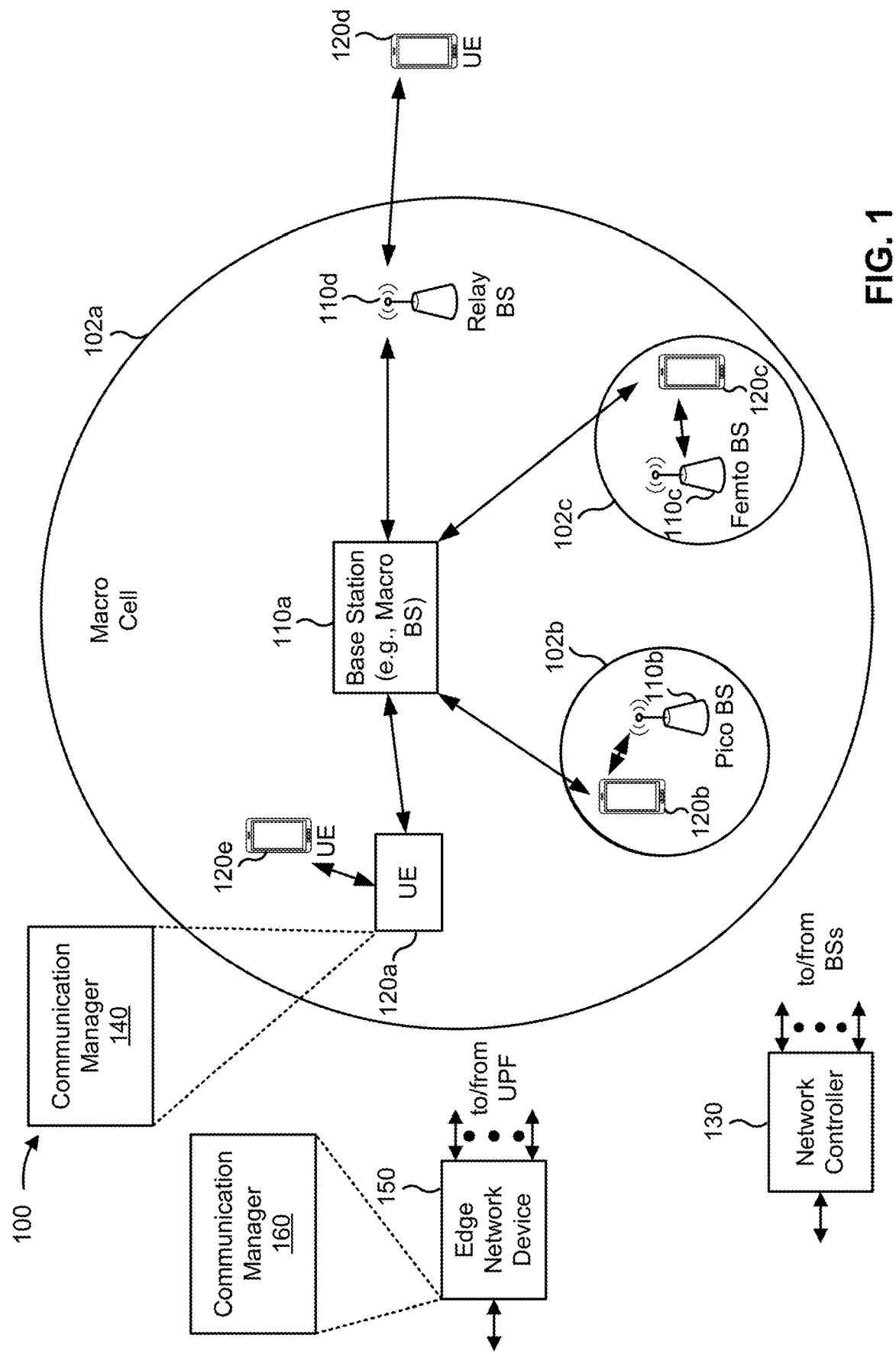
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

In some examples, UE 120 may communicate with an edge network device 150 of an edge network. The edge network device 150 may offload processing of the UE 120 and help the UE 120 to conserve power and perform other functions. The UE 120 may communicate with the edge network device 150 via the base station 110 and a user plane function (UPF). The edge network device 150 may communicate with a core network or a cloud computing network.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with application client (AC) and edge application server (EAS) discovery with service authorization and location service. Additionally, or alternatively, the communication manager 140 may perform one or more other operations described herein.

In some aspects, the edge network device 150 may include a communication manager 160. As described in more detail elsewhere herein, the communication manager 160 may perform one or more operations associated with AC and EAS discovery with service authorization and location service. Additionally, or alternatively, the communication manager 160 may perform one or more other operations described herein.

As indicated above, FIG. 1 is provided as an example. Other examples may differ from what is described with regard to FIG. 1.

Figure 2:
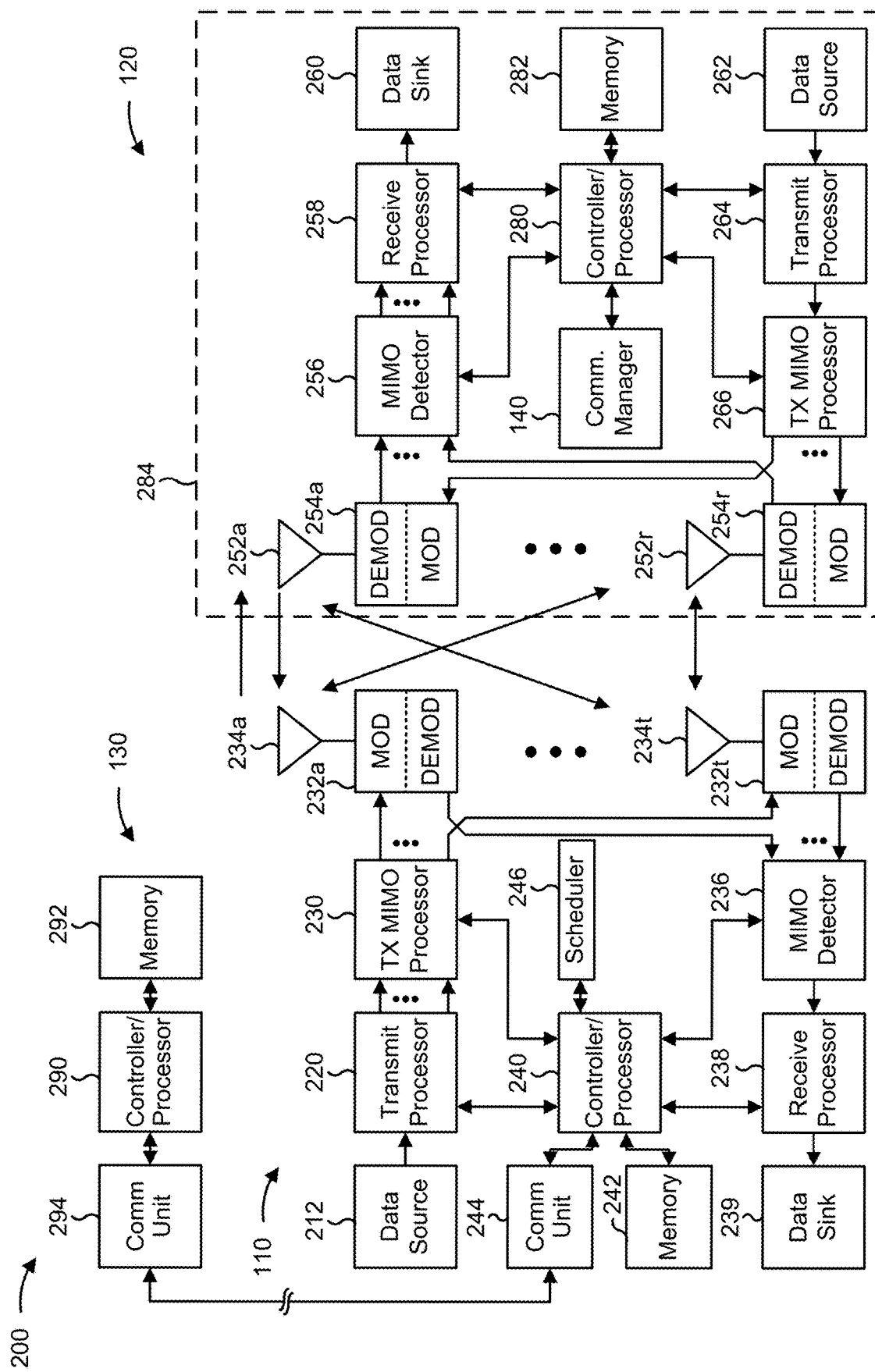
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-15).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-15).

The controller/processor 240 of the base station 110, the controller/processor 280 of the UE 120, and/or any other component(s) of FIG. 2 may perform one or more techniques associated with AC and EAS discovery with service authorization and location service, as described in more detail elsewhere herein. In some aspects, the AC and/or the EEC described herein are the UE 120, are included in the UE 120, or include one or more components of the UE 120 shown in FIG. 2. In some aspects, the EAS, the edge configuration server (ECS), or the edge enabler server (EES) described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE includes means for receiving a first EAS discovery message from an application client that is external to the UE; means for transmitting a second EAS discovery message to an EES based at least in part on the first EAS discovery message; means for receiving, from the EES, an EAS response message, wherein the EAS response message indicates a failure of a discovery request associated with the application client or the EAS response message indicates an EAS associated with the application client; and/or means for transmitting an indication of the failure of the discovery request or an indication of the EAS to the application client. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving, by an EEC of the UE, an edge application client (EAC) registration message from an application client that is external to the UE, wherein the EAC registration message from the application client indicates a device identifier associated with the application client; and/or means for transmitting a response to the application client, wherein the response indicates a result of the application client registering with the EEC, wherein the result is based at least in part on whether a list of devices indicates that the device identifier is associated with an authorized application client or an unauthorized application client. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving, by an EEC of the UE and from a first application client, an EAC discovery request message, wherein the first application client is external to the UE; and/or means for transmitting an EAC discovery response message to the first application client, wherein the EAC discovery response message indicates a second application client to enable the first application client to communicate with the second application client. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the EES includes means for receiving, from an EEC of a UE, an address of an application client connected to the EEC, wherein the application client is included in a device that is external to the UE; means for receiving, from an EAS, a request for location information associated with the address of the application client; and/or means for transmitting, to the EAS, a response to the request, wherein the response indicates a location of the EEC based at least in part on the application client being connected to the EEC. In some aspects, the means for the EES to perform operations described herein may include, for example, one or more of transmit processor 220, TX MIMO processor 230, modem 232, antenna 234, MIMO detector 236, receive processor 238, controller/processor 240, memory 242, or scheduler 246. In some aspects, the means for the EEC to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
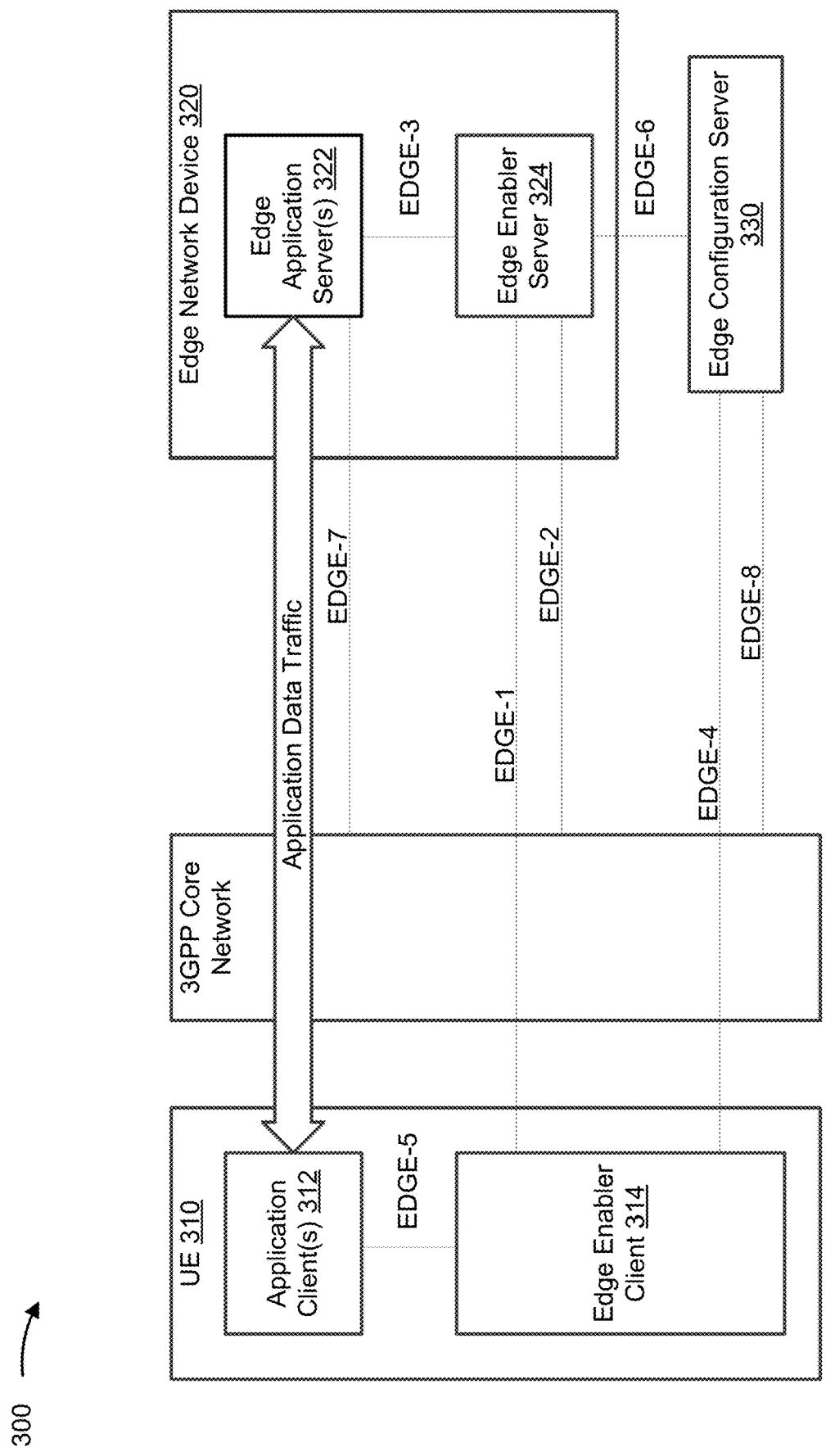
FIG. 3 is a diagram illustrating an example of edge computing, in accordance with the present disclosure.

FIG. 3 is a diagram illustrating an example 300 of edge computing, in accordance with the present disclosure. FIG. 3 shows a UE 310 (e.g., UE 120) with an AC 312 that shares application data traffic with an EAS 322 of an edge network device 320 (e.g., edge network device 150) in an edge data network. FIG. 3 also shows an EEC 314 of the UE 310 that communicates with an EES 324 of the edge network device 320.

Edge computing brings network devices closer to a UE in order to supplement the UE's capabilities and to enhance user services. Edge network devices, such as edge network device 320, may offload processing of the UE 310 and help the UE 310 to conserve power and to multi-task. When the UE 310 is using an application, an application context is created where processing for the application occurs (point of compute), and the point of compute may be in the edge network device 320 or on the UE 310. More specifically, the application context connected to the application may reside on the edge application server 322 of the edge network device 320 or on the application client 312 of the UE 310. The application client 312 on the UE 310 may execute the application that is associated with or supported by the application context. The application context may include application data and may include a present state of the application. For example, a user playing an online game may not want to lose a current state of the game, which may include a status of an avatar of the user, a location of the avatar, an inventory of the avatar, and/or an ability of the avatar. If such characteristics of the avatar are not maintained during a mobility event of the UE 310 or during a change in traffic conditions, the user may experience game presentation errors, or the application may fail altogether. If the application is a serving a business, the application may affect production or customer relations for the company.

The EES 324 of the edge network device 320 may handle operations of the EAS 322, including making decisions to set up and take down the EAS 322, and perform other custodial functions. The EES 324 may communicate with an ECS 330, which may configure the EES 324 and the EEC 314. When an application changes a point of compute, the application context may need to be transferred to another EES. The EES 324 may thus determine whether an application context needs to be relocated to another EES.

To enable the AC 312 to connect to an EAS 322 that is close (e.g., located within a threshold distance) to the UE 310, prior to the AC 312 connecting to the EAS 322, the EEC 314 may perform an EAS discovery procedure with the EES 324. For example, the EEC 314 may transmit an EAS discovery request to the EES 324 (e.g., via an EDGE-1 interface). The EAS discovery request may include an AC identifier associated with the AC 312, a device identifier associated with the UE 310, and an AC profile associated with the AC 312.

The AC profile may indicate one or more parameters used to determine a matching EAS. For example, the AC profile may indicate an AC type (e.g., a category or type of AC, such as V2X, payment processing, or file sharing, among other examples), an AC schedule indicating an expected operation schedule (e.g., time window) of the AC 312, an expected location or route of the UE 310 during the operation schedule, or a service key performance indicator (KPI) required by the AC 312, among other examples.

The EES 324 may receive the EAS discovery request and may identify an EAS based at least in part on the one or more parameters indicated by the AC profile. The EES 324 may transmit a response to the EAS discovery message to the EEC 314. The response may include information that enables the UE 310 (e.g., the AC 312) to identify and/or connect to the EAS 322. For example, the response may include an EAS identifier of the EAS 322 or endpoint information (e.g., a network address), among other examples. The EEC 314 may provide the information included in the response to the AC 312 to enable the AC 312 to connect to the EAS 322.

In some cases, a UE may not include an EEC and/or may not be able to access the EES 324 to obtain information regarding applicable EASs. For example, an IoT device, or a virtual reality (VR) or extended reality (XR) device, may not have a complicated high level operating system (HLOS), may not be able to access the edge network, or an edge-related feature may not be implemented on the UE.

Some techniques and apparatuses described herein enable a UE that includes an EEC to communicate with an AC included on devices external to the UE and to perform an EAS discovery process for the AC. For example, the EEC may receive an EAS discovery request message associated with an AC included on a device that is external to the UE. The EEC may perform an EAS discovery process with an EES to obtain information indicating an EAS that is a geographically and/or topologically closest EAS to the external AC. The EEC may provide an indication of the EAS to the external AC to enable the external AC to connect to the EAS. In this way, the EEC may enable the UE to act as a gateway UE (e.g., acting as EEC) for UEs that do not include an EEC, have constrained computing resources, or have simple implementations, which may enable these devices to implement edge computing use cases (e.g., location specific service or low latency, among other examples).

Figure 4:
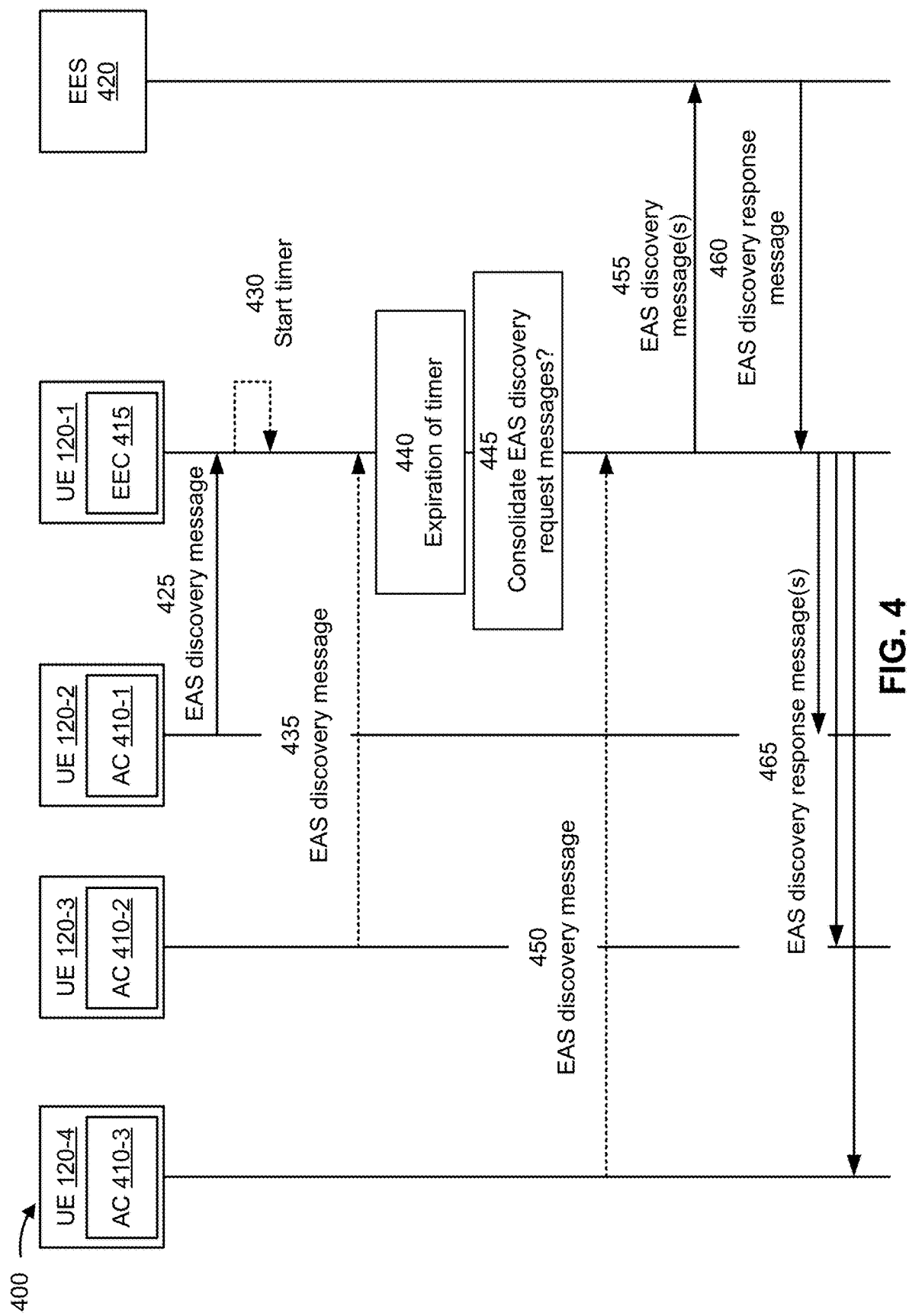
FIG. 4 is a diagram illustrating an example associated with edge application server (EAS) discovery, in accordance with the present disclosure.

FIG. 4 is a diagram illustrating an example 400 associated with EAS discovery with service authorization, in accordance with the present disclosure. As shown in FIG. 4, example 400 includes communication between a group of application clients (e.g., AC 410-1, AC 410-2, and AC 410-3, as shown) included on a group of UEs 120 (e.g., UE 120-2, UE 120-3, and UE 120-4, as shown), an EEC 415 included on a UE 120 (e.g., UE 120-1, as shown), and an EES 420 associated with an edge network. In some aspects, the group of application clients (e.g., UE 120-2, UE 120-3, and UE 120-4), the EEC 415 (e.g., UE 120-1), and the EES 420 may be included in a wireless network, such as wireless network 100. The group of application clients, the EEC 415, and the EES 420 may communicate via a wireless access link, which may include an uplink and a downlink.

As shown by reference number 425, the AC 410-1 may transmit, and the EEC 415 may receive, an EAS discovery message. The AC 410-1 may transmit the EAS discovery message to obtain information identifying an EAS included in an edge network. In some aspects, to discover an EAS, the AC 410-1 may invoke an EAS discovery application program interface (API) by providing an EAS discovery message that includes EAS discovery information. In some aspects, the EAS discovery information includes an application identifier associated with the AC 410-1, a device identifier associated with the UE 120-2, and/or an EAS discovery filter.

In some aspects, the EAS discovery filter may indicate an AC profile associated with the AC 410-1. The AC profile may indicate one or more parameters used to determine a matching EAS. In some aspects, the one or more parameters may include an identifier of the AC 410-1, an AC type associated with the AC 410-1, a service provider associated with the AC 410-1 or the matching EAS, an AC schedule (e.g., a time window during which the AC is to be connected to the EAS), an expected geographical service area (e.g., the expected location or route of the UE 120-2 during the operation schedule of the AC 410-1), a list of EASs that service the AC 410-1, or key performance indicators (KPIs) required by the AC 410-1, among other examples.

In some aspects, as shown by reference number 430, the EEC 415 may initiate a timer based at least in part on receiving the EAS discovery message. The EEC 415 may initiate the timer to enable the EEC 415 to aggregate EAS discovery request messages received from multiple ACs within a time period (e.g., a time period defined by an initiation and subsequent expiration of the timer).

In some aspects, as shown by reference number 435, prior to the expiration of the timer, the EEC 415 may receive a second EAS discovery message from the AC 410-2. The second EAS discovery message may include EAS discovery information associated with the AC 410-2. The EAS discovery information associated with the AC 410-2 may be similar to the EAS discovery information described elsewhere herein.

As shown by reference number 440, the EEC 415 may determine the expiration of the timer. As shown by reference number 445, the EEC 415 may determine whether to consolidate the EAS discovery messages received prior to the expiration of the timer. In some aspects, the EEC 415 may determine whether to consolidate the EAS discovery messages received from the AC 410-1 and the AC 410-2 based at least in part on a location of the AC 410-1 and the AC 410-2 (e.g., a location of the UE 120-2 and a location of the UE 120-3). For example, the EEC 415 may determine whether a distance between the AC 410-1 and the EEC 415 satisfies a threshold. The EEC 415 may determine that a location of the AC 410-1 can be considered the same as the location of the EEC 415 when the distance between the AC 410-1 and the EEC 415 satisfies a threshold.

Similarly, the EEC 415 may determine whether the distance between the AC 410-2 and the EEC 415 satisfies the threshold. The EEC 415 may determine that a location of the AC 410-2 can be considered the same as the location of the EEC 415 when the distance between the AC 410-2 and the EEC 415 satisfies the threshold. The EEC 415 may determine to aggregate or combine the EAS discovery messages received prior to the expiration of the timer from ACs (e.g., from the AC 410-1 and the AC 410-2) having a location of the AC 410-1 that can be considered the same as the location of the EEC 415. The EEC 415 may generate a separate EAS discovery message for each AC having a location that cannot be considered the same as the location of the EEC 415.

In some aspects, as shown by reference number 450, the AC 410-3 may transmit, and the EEC 415 may receive, a third EAS discovery message after the expiration of the timer. The EEC 415 may generate a separate EAS discovery message for the AC 410-3 based at least in part on the third EAS discovery message being received after the expiration of the timer.

As shown by reference number 455, the EEC 415 may transmit, and the EES 420 may receive, one or more EAS discovery messages based at least in part on the EAS discovery messages received from the AC 410-1, the AC 410-2, and/or the AC 410-3. For example, the EEC 415 may transmit a first EAS discovery message that includes the EAS discovery information for the AC 410-1 and the AC 410-2 based at least in part on the location of the AC 410-1 and the AC 410-2 being considered as the same as the location of the EEC 415 and based at least in part on the EEC 415 receiving the EAS discovery messages from the AC 410-1 and the AC 410-2 prior to the expiration of the timer. The EEC 415 may transmit a second EAS discovery message that includes the EAS discovery information for the AC 410-3 based at least in part on receiving the third discovery message after the expiration of the timer.

As shown by reference number 460, the EES 420 may transmit, and the EEC 415 may receive, one or more EAS discovery response messages. An EAS discovery response message may indicate a result associated with a corresponding EAS discovery message. For example, an EAS discovery response message may indicate a success of the EAS discovery message, a list of one or more matching EASs, or a failure of the EAS discovery message. The EAS discovery response message may indicate the success of the EAS discovery message and/or the list of matching EASs when the AC is authorized to utilize a service or application provided by an EAS or when a matching EAS is identified by the EES 420. The EAS discovery response message may indicate the failure of the EAS discovery message when the AC is not authorized to utilize a service or application provided by an EAS or when a matching EAS is not identified by the EES 420.

In some aspects, the EEC 415 may receive a first EAS discovery response message that indicates a result of the EAS discovery messages associated with the AC 410-1 and the AC 410-2 (e.g., a first EAS discovery response message indicating a matching EAS for the AC 410-1 and a matching EAS for the AC 410-2). For example, the EEC 415 may receive the first EAS discovery response message when the EEC 415 aggregates the EAS discovery messages received from the AC 410-1 and the AC 410-2.

In some aspects, the EEC 415 may de-aggregate (e.g., de-multiplex) the first EAS discovery response message per corresponding AC. The EEC 415 may generate a separate EAS discovery response message for each corresponding AC.

In some aspects, the EEC 415 may receive a second EAS discovery response message that indicates a result of the EAS discovery message associated with the AC 410-3 (e.g., a second EAS discovery response message indicating a matching EAS for the AC 410-3). For example, the EEC 415 may receive the second EAS discovery response message when the EEC 415 receives the third EAS discovery message from the AC 410-3 after the expiration of the timer and/or based at least in part on transmitting the second EAS discovery message to the EES 420.

As shown by reference number 465, the EEC 415 may transmit one or more EAS discovery response messages based at least in part on the EAS discovery response message received from the EES 420. For example, the EEC 415 may transmit a first EAS discovery response message to the AC 410-1 (e.g., the UE 120-1), a second EAS discovery response message to the AC 410-2 (e.g., the UE 120-2), and a third EAS discovery response message to the AC 410-3 (e.g., the UE 120-3).

As indicated above, FIG. 4 is provided as an example. Other examples may differ from what is described with respect to FIG. 4.

Figure 5A:
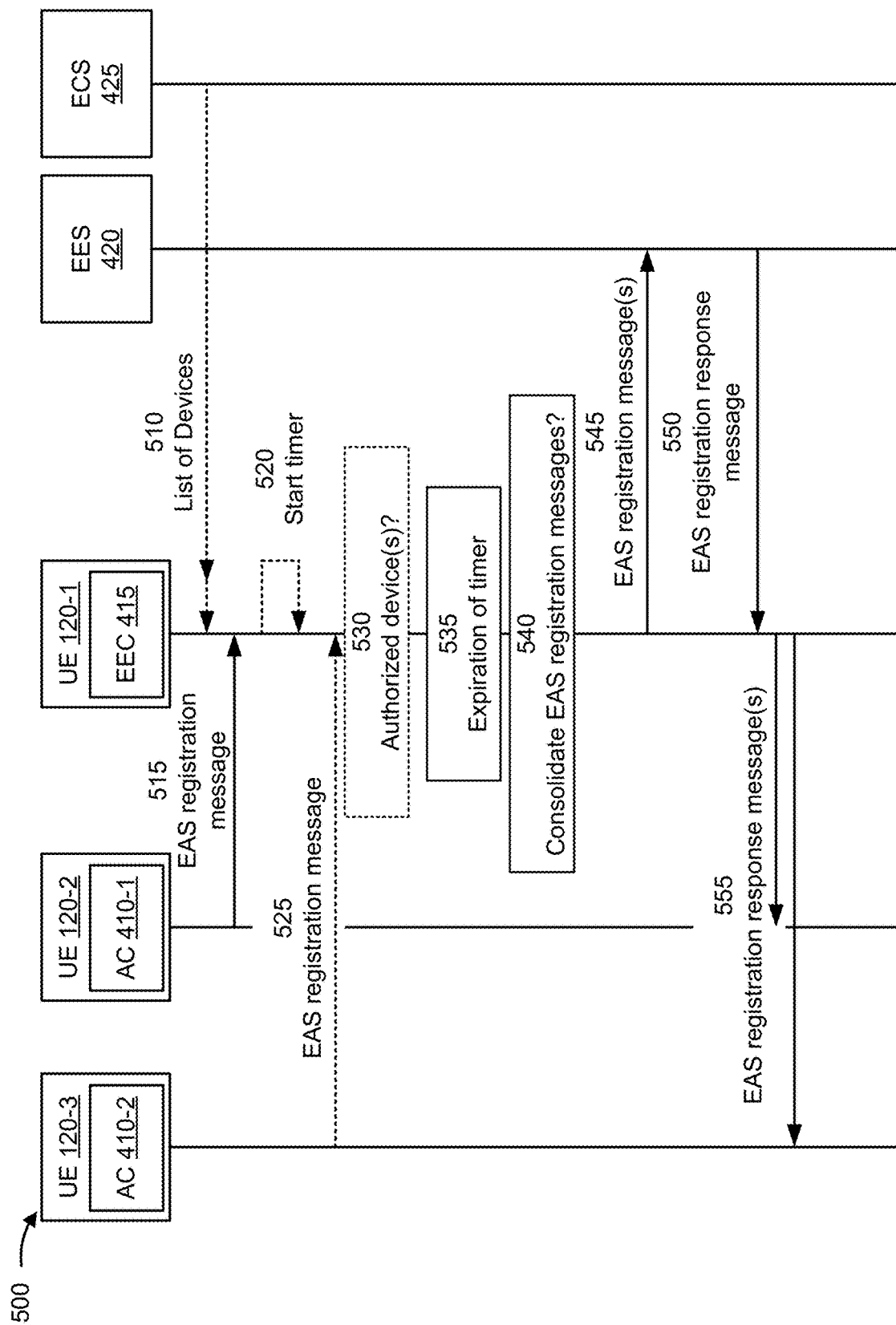

FIGS. 5A and 5B are diagrams illustrating an example 500 associated with EAS registration with service authorization, in accordance with the present disclosure. As shown in FIGS. 5A and 5B, example 500 includes communication between a group of application clients (e.g., AC 410-1 and AC 410-2, as shown) included on a group of UEs 120 (e.g., UE 120-2 and UE 120-3, as shown), an EEC 415 included on a UE 120 (e.g., UE 120-1, as shown), and an EES 420 and an ECS 425 associated with an edge network. In some aspects, the group of application clients (e.g., UE 120-2 and UE 120-3), the EEC 415 (e.g., UE 120-1), the EES 420, and the ECS 425 may be included in a wireless network, such as wireless network 100. The group of application clients, the EEC 415, the EES 420, and the ECS 425 may communicate via a wireless access link, which may include an uplink and a downlink.

In some aspects, as shown in FIG. 5A, and by reference number 510, the EEC 415 may receive a list of devices from the EES 420 and/or the ECS 425. The list of devices may indicate one or more devices that are not authorized to utilize a feature, a service, or an application provided by an EAS or the edge network and/or one or more devices that are authorized to utilize a feature, a service, or an application provided by an EAS or the edge network. For example, the list of devices may include a list of device identifiers associated with one or more devices that are not authorized to utilize a feature, a service, or an application provided by an EAS or the edge network and/or a list of device identifiers associated with one or more devices that are authorized to utilize a feature, a service, or an application provided by an EAS or the edge network.

In some aspects, the EEC 415 may receive the list of devices from the EES 420 during an AC registration process for registering the EEC 415 to the EES 420. In some aspects, the EEC 415 may receive the list of devices from the ECS 425 during service provisioning with the ECS 425.

As shown by reference number 515, the EEC 415 may receive an EAS registration message from the AC 410-1. The EAS registration message may include a device identifier associated with the UE 120-2 and an AC profile associated with the AC 410-1.

In some aspects, as shown by reference number 520, the EEC 415 may initiate a timer based at least in part on receiving the EAS registration message from the AC 410-1. The EEC 415 may initiate the time to enable the EEC 415 to aggregate EAS registration messages received prior to an expiration of the timer in a manner similar to that described elsewhere herein.

In some aspects, as shown by reference number 525, the EEC 415 may receive a second EAS registration message from the AC 410-2 prior to the expiration of the timer. The second EAS registration message may include a device identifier associated with the UE 120-3 and an AC profile associated with the AC 410-2.

In some aspects, as shown by reference number 530, the EEC 415 may determine whether the AC 410-1 (e.g., the UE 120-2) and/or the AC 410-2 (e.g., the UE 120-3) correspond to authorized or unauthorized devices. For example, the EEC 415 may determine whether the AC 410-1 and/or the AC 410-2 correspond to authorized or unauthorized devices when the EEC 415 receives the list of devices from the EES 420 during the registration process or from the ECS 425 during service provisioning.

In some aspects, the EEC 415 may determine that the AC 410-1 or the AC 410-2 is an unauthorized device. For example, the list of devices may indicate that the device identifier associated with the UE 120-2 or the device identifier associated with the UE 120-3 is a device identifier of an unauthorized device. The EEC 415 may transmit an EAS registration response message indicating a failure of the EAS registration request message to the AC 410-1 (e.g., the UE 120-2) or the AC 410-2 (e.g., the UE 120-3) based at least in part on the list of devices indicating that the device identifier associated with the UE 120-2 or the device identifier associated with the UE 120-3 is a device identifier of an unauthorized device.

As shown by reference number 535, the EEC 415 may determine the expiration of the timer. As shown by reference number 540, the EEC 415 may determine whether to consolidate the EAS registration messages received from the AC 410-1 and the AC 410-2. The EEC 415 may determine whether to consolidate the EAS registration messages received from the AC 410-1 and the AC 410-2 based at least in part on a location of the AC 410-1 and a location of the AC 410-2, in a manner similar to that described elsewhere herein.

As shown by reference number 545, the EEC 415 may transmit, and the EES 420 may receive, one or more EAS registration messages. In some aspects, the EEC 415 may transmit a single EAS registration message to the EES 420 based at least in part on consolidating the EAS registration messages received from the AC 410-1 and the AC 410-2. The single EAS registration message may include a list of devices (e.g., a list of device identifiers associated with the UE 120-2 and the UE 120-3) connected to the EEC 415. In some aspects, the EEC 415 may transmit a first EAS registration message associated with the AC 410-1 and a second EAS registration message associated with the AC 410-2 when the EEC 415 determines not to consolidate the EAS registration messages received from the AC 410-1 and the AC 410-2. The first EAS registration message may include a device identifier of the UE 120-2 and the second EAS registration message may include a device identifier of the UE 120-3.

As shown by reference number 550, the EES 420 may transmit, and the EEC 415 may receive, one or more EAS registration response messages. The one or more EAS registration response messages may indicate a success or failure of the EAS registration messages. In some aspects, the one or more EAS registration response messages include the list of devices. In these aspects, the EEC 415 may determine whether the AC 410-1 and/or the AC 410-2 correspond to authorized or unauthorized devices in a manner similar to that described elsewhere herein.

As shown by reference number 555, the EEC 415 may transmit one or more EAS registration response messages. The EEC 415 may transmit a first EAS registration response message to the AC 410-1 indicating a success or failure of the EAS registration request message received from the AC 410-1. The EEC 415 may transmit a second EAS registration response message to the AC 410-1 indicating a success or failure of the second EAS registration request message received from the AC 410-2.

As shown in FIG. 5B, and by reference number 560, the EEC 415 may receive an EAS discovery message from the AC 410-1. For example, the AC 410-1 (e.g., the UE 120-2) may transmit an EAS discovery message to the EEC 415 based at least in part on receiving an EAS registration response message indicating a success of the EAS registration request message associated with the AC 410-1.

In some aspects, as shown by reference number 565, the EEC 415 may receive a second EAS discovery message from the AC 410-2. For example, the AC 410-2 (e.g., the UE 120-3) may transmit the second EAS discovery message to the EEC 415 based at least in part on receiving an EAS registration response message indicating a success of the second EAS registration request message associated with the AC 410-2.

In some aspects, as shown by reference number 570, the EEC 415 may determine whether the AC 410-1 (e.g., the UE 120-2) and/or the AC 410-2 correspond to authorized devices or unauthorized devices. The EEC 415 may determine whether the AC 410-1 and/or the AC 410-2 correspond to authorized devices or unauthorized devices based at least in part on the list of devices, in a manner similar to that described elsewhere herein.

As shown by reference number 575, the EEC 415 may transmit, and the EES 420 may receive, one or more EAS discovery messages. For example, the EEC 415 may initiate a timer and may determine whether to aggregate the EAS discovery messages received from the AC 410-1 and the AC 410-2, in a manner similar to that described elsewhere herein.

As shown by reference number 580, the EES 420 may transmit, and the EEC 415 may receive, an EAS discovery response message. The EAS discovery response message may indicate a success or failure of the EAS discovery messages, in a manner similar to that described elsewhere herein.

In some aspects, as shown by reference number 585, the EEC 415 may determine whether the AC 410-1 (e.g., the UE 120-2) and/or the AC 410-2 correspond to authorized devices or unauthorized devices. For example, the list of devices may be included in the EAS discovery response message received from the EES 420. The EEC 415 may determine whether the AC 410-1 and/or the AC 410-2 correspond to authorized devices or unauthorized devices based at least in part on the list of devices, in a manner similar to that described elsewhere herein.

As shown by reference number 590, the EEC 415 may transmit one or more EAS discovery response messages. The EEC 415 may transmit a first EAS discovery response message to the AC 410-1 and a second EAS discovery response message to the AC 410-2. The first EAS discovery response message may indicate a success or failure of the EAS discovery request message associated with the AC 410-1 and the second EAS discovery response message may indicate a success or failure of the second EAS discovery request message.

As indicated above, FIGS. 5A and 5B are provided as an example. Other examples may differ from what is described with respect to FIGS. 5A and 5B.

Figure 6A:
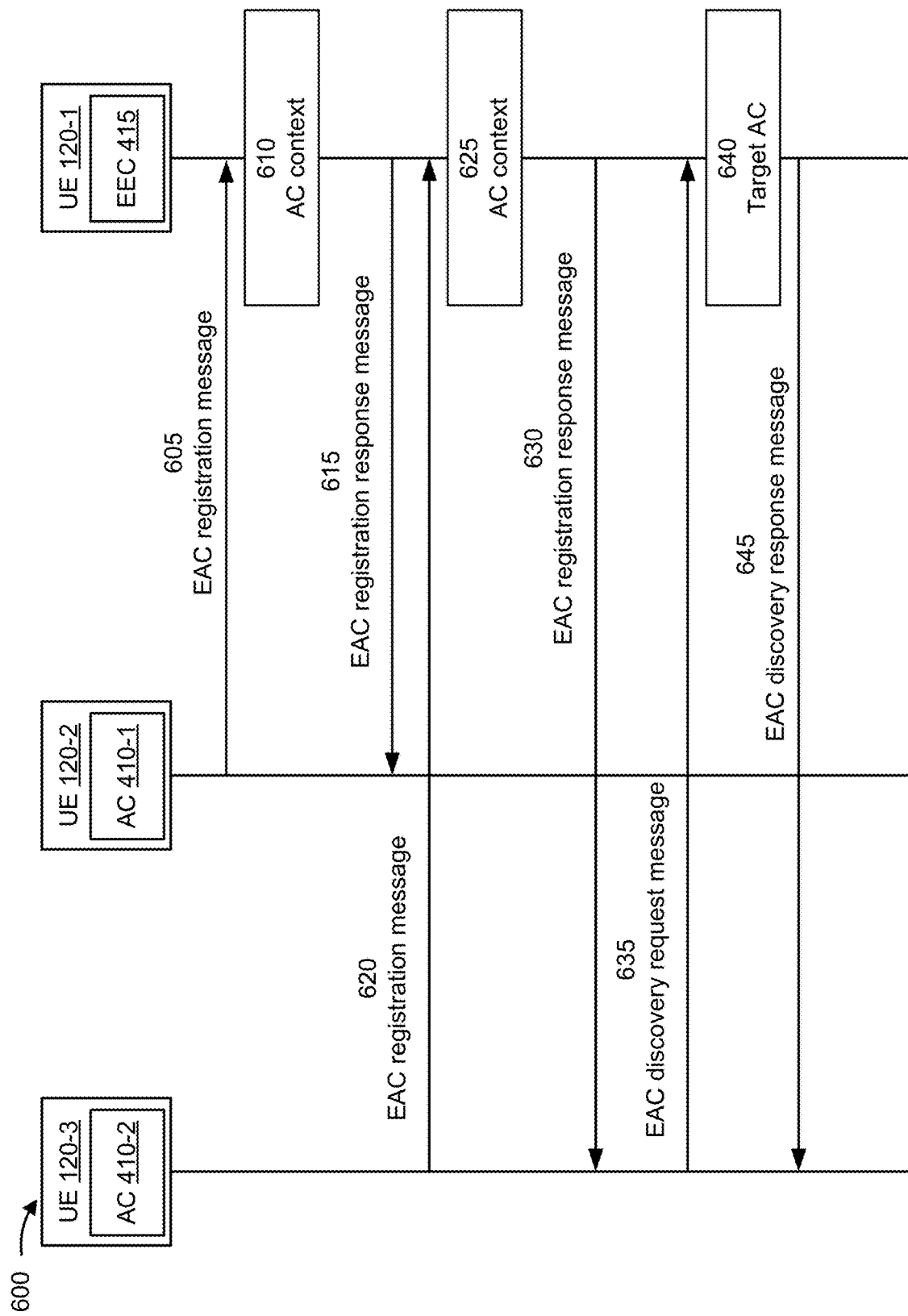
FIGS. 6A and 6B are diagrams illustrating an example associated with mutual application client (AC) discovery, in accordance with the present disclosure.
Figure 6B:
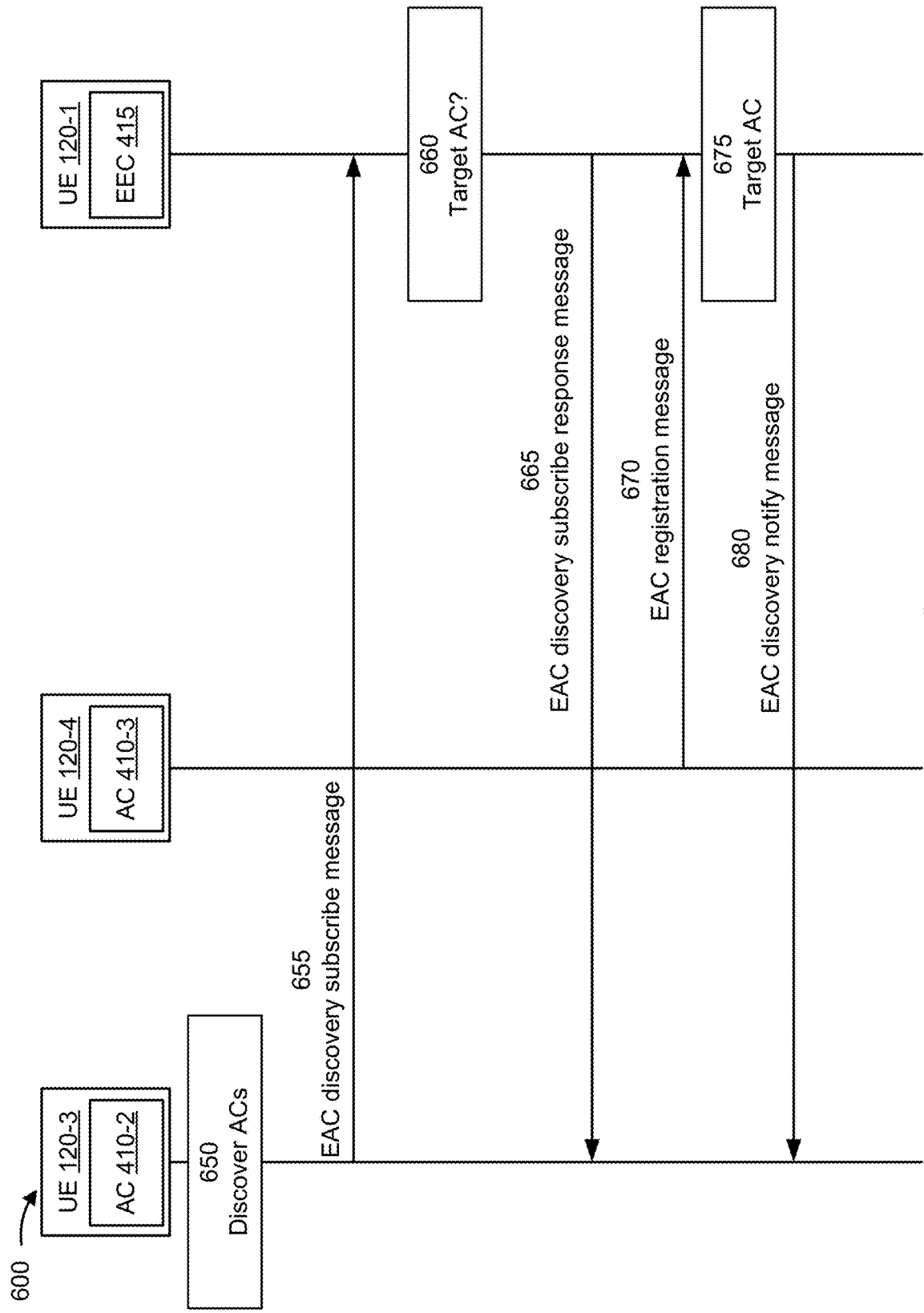

FIGS. 6A and 6B are diagrams illustrating an example 600 associated with mutual AC discovery, in accordance with the present disclosure. As shown in FIGS. 6A and 6B, example 600 includes communication between a group of application clients (e.g., AC 410-1, AC 410-2, and AC 410-3, as shown) included on a group of UEs 120 (e.g., UE 120-2, UE 120-3, and UE 120-4, as shown) and an EEC 415 included on a UE 120 (e.g., UE 120-1, as shown). In some aspects, the group of application clients (e.g., UE 120-2, UE 120-3, and UE 120-4) and the EEC 415 (e.g., UE 120-1) may be included in a wireless network, such as wireless network 100. The group of application clients and the EEC 415 may communicate via a wireless access link, which may include an uplink and a downlink.

As shown in FIG. 6A, and by reference number 605, the EEC 415 may receive an EAC registration message from the AC 410-1. In some aspects, the EAC registration message includes an application client identifier associated with the AC 410-1, an application client type (e.g., V2X, IoT, a payment service, or a media cache service, among other examples) associated with the AC 410-1, endpoint information (e.g., an IP address) associated with the AC 410-1, service information (e.g., a service type or a service provider identifier, among other examples) associated with the AC 410-1, one or more EAS characteristics, or a capability list of edge interface APIs (e.g., an AC discovery API), among other examples.

As shown by reference number 610, the EEC 415 may generate and/or store an AC context associated with the AC 410-1. The AC context may indicate the application client identifier associated with the AC 410-1, the application client type associated with the AC 410-1, the endpoint information associated with the AC 410-1, the service information associated with the AC 410-1, the one or more EAS characteristics, and/or the capability list of edge interface APIs, among other examples. In some aspects, an existing AC context for the AC 410-1 may be stored in a memory associated with the EEC 415. The EEC 415 may update the existing AC context with information included in the EAC registration message.

As shown by reference number 615, the EEC 415 may transmit, and the AC 410-1 may receive, an EAC registration response message. The EAC registration response message may include the application client identifier associated with the AC 410-1 and an indication of a success or failure of the EAS registration message.

As shown by reference number 620, the EEC 415 may receive a second EAC registration message from the AC 410-2. The second EAC registration message may include an application client identifier associated with the AC 410-2, an application client type associated with the AC 410-2, endpoint information associated with the AC 410-2, service information associated with the AC 410-2, one or more EAS characteristics, and/or a capability list of edge interface APIs, among other examples.

As shown by reference number 625, the EEC 415 may generate and/or store an AC context associated with the AC 410-2. The EEC 415 may generate an AC context for the AC 410-2 in a manner similar to that described elsewhere herein.

As shown by reference number 630, the EEC 415 may transmit, and the AC 410-2 may receive, an EAC registration response message. The EAC registration response message may include the application client identifier associated with the AC 410-1 and may indicate a success or failure of the second EAC registration message.

As shown by reference number 635, the EEC 415 may receive an EAC discovery request message from the AC 410-2. In some aspects, the AC 410-2 may determine to discover other ACs related to a particular service. The AC 410-2 may cause the EAC discovery request message to be transmitted to the EEC 415 to request information indicating other ACs related to the particular service from the EEC 415.

In some aspects, the EAC discovery request message includes an application client identifier associated with the AC 410-2 and an AC discovery filter. The AC discovery filter may indicate an application client type, a service type, and/or a service provider identifier associated with an application client that the AC 410-2 desires to discover.

As shown by reference number 640, the EEC 415 may identify a target AC that is registered with the EEC 415. The EEC 415 may identify the target AC based at least in part on the AC discovery filter and the AC contexts stored in the memory associated with the EEC 415.

As shown by reference number 645, the EEC 415 may transmit, and the AC 410-2 may receive, an EAC discovery response message. The EAC discovery response message may include information enabling the AC 410-1 to discover the target AC. For example, the EAC discovery response message may include an application client identifier associated with the target AC, an application client type associated with the target AC, endpoint information associated with the target AC, and/or service information associated with the target AC, among other examples.

FIG. 6B illustrates an example of a subscribe/notify model associated with AC discovery. As shown by reference number 650, the AC 410-2 may determine to discover one or more ACs registered with the EEC 415. For example, the AC 410-2 may determine to discover other ACs registered with the EEC 415 that are related to or provide a particular service.

As shown by reference number 655, the AC 410-2 may transmit, and the EEC 415 may receive, an EAC discovery subscribe message. The AC 410-2 may cause the EAC discovery subscribe message to be transmitted to the EEC 415 to request information indicating other ACs related to or provide the particular service from the EEC 415.

In some aspects, the EAC discovery subscribe message includes an application client identifier associated with the AC 410-2 and an AC discovery filter. The AC discovery filter may indicate an application client type, a service type, and/or a service provider identifier associated with an application client that the AC 410-2 desires to discover.

As shown by reference number 660, the EEC 415 may determine whether a target AC is registered with the EEC 415. The EEC 415 may determine whether a target AC is registered with the EEC 415 based at least in part on the AC discovery filter and the AC contexts stored in the memory associated with the EEC 415. In some aspects, the EEC 415 may identify a target AC registered with the EEC 415, and the EEC 415 may transmit an EEC discovery response message indicating the target AC to the AC 410-2 in a manner similar to that described elsewhere herein.

In some aspects, a target AC may not be registered with the EEC 415. The EEC 415 may store the AC discovery filter and the application client identifier associated with the AC 410-2 in the memory and may utilize the AC discovery filter to identify a target AC that subsequently registers with the EEC 415, as described elsewhere herein.

As shown by reference number 665, the EEC 415 may transmit, and the AC 410-2 may receive, an EAC discovery subscribe response message. The EAC discovery subscribe response message may indicate a failure of the EEC 415 to identify the target AC and/or may indicate that the AC 410-2 is subscribed to a discovery subscribe service. The discovery subscribe service may enable the AC 410-2 to receive a notification of a target AC based at least in part on the target AC registering with the EEC 415, as described elsewhere herein.

As shown by reference number 670, the EEC 415 may receive an EAC registration message from the AC 410-3. In some aspects, the EEC 415 may receive the EAC registration message from the AC 410-3 in a manner similar to that described elsewhere herein. In some aspects, the EEC 415 may generate an AC context associated with the AC 410-3 based at least in part on receiving the EAC registration message from the AC 410-3.

As shown by reference number 675, the EEC 415 may determine that the AC 410-3 corresponds to a target AC for the AC 410-2. In some aspects, the EEC 415 may determine that the AC 410-3 corresponds to the target AC for the AC 410-2 based at least in part on the AC context generated for the AC 410-3 and the AC discovery filter associated with the AC 410-2 and stored in the memory associated with the EEC 415.

As shown by reference number 680, the EEC 415 may transmit, and the AC 410-2 may receive, an EAC discovery notify message. The EAC discovery notify message may include information enabling the AC 410-2 to communicate with the AC 410-3. For example, the EAC discovery notify message may indicate an application client identifier associated with the AC 410-3, an application client type associated with the AC 410-3, endpoint information for the AC 410-3, or service information associated with the AC 410-3, among other examples.

As indicated above, FIGS. 6A and 6B are provided as an example. Other examples may differ from what is described with respect to FIGS. 6A and 6B.

Figure 7:
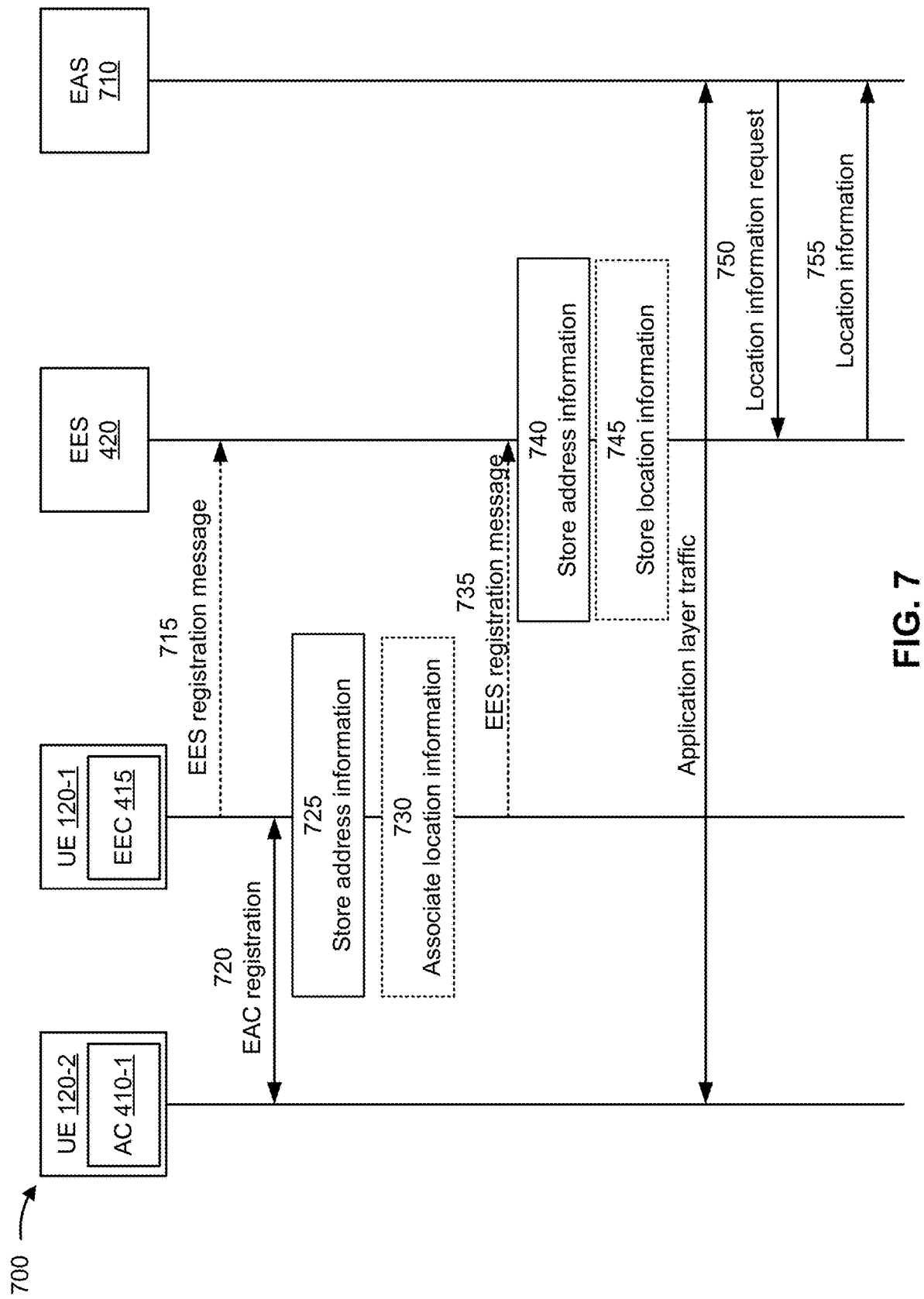
FIG. 7 is a diagram illustrating an example process associated with location services for external ACs, in accordance with the present disclosure.

FIG. 7 is a diagram illustrating an example 700 associated with location services for external ACs, in accordance with the present disclosure. As shown in FIG. 7, example 700 includes communication between an application client (e.g., AC 410-1, as shown) included on a UE 120 (e.g., UE 120-2, as shown), an EEC 415 included on a UE 120 (e.g., UE 120-1, as shown), and an EES 420 and an EAS 710 associated with an edge network. In some aspects, the application client (e.g., UE 120-2), the EEC 415 (e.g., UE 120-1), the EES 420, and the EAS 710 may be included in a wireless network, such as wireless network 100. The application client, the EEC 415, the EES 420, and the EAS 710 may communicate via a wireless access link, which may include an uplink and a downlink.

In some aspects, as shown by reference number 715, the EEC 415 may transmit, and the EES 420 may receive, an EES registration message. For example, the EEC 415 may perform a registration procedure with the EES 420. In some aspects, the EES registration message indicates a capability of the EEC 415 to act as a gateway UE for external devices (e.g., application clients included on external devices) behind (e.g., connected to) the EEC 415. The EES 420 may store an indication of the capability of the EEC 415 to act as a gateway UE for external devices behind the EEC 415 in an EEC context associated with the EEC 415.

As shown by reference number 720, the AC 410-1 may register with the EEC 415. In some aspects, the AC 410-1 may register with the EEC 415 in a manner similar to that described elsewhere herein.

As shown by reference number 725, the EEC 415 may store address information for the AC 410-1. For example, the AC 410-1 may transmit a registration message (e.g., an EAS registration message or an EAC registration message) to the EEC 415. The registration message may indicate an address (e.g., an IP address) of the AC 410-1. The EEC 415 may store the address of the AC 410-1 in an AC context associated with the AC 410-1.

In some aspects, as shown by reference number 730, the EEC 415 may associate location information for the AC 410-1 with the stored address information. For example, the registration message may include location information indicating a geographic location of the AC 410-1. The EEC 415 may store the location information in the AC context associated with the AC 410-1. Alternatively, and/or additionally, the EEC 415 may determine that the location of the AC 410-1 can be considered the same as the location of the EEC 415, as described elsewhere herein. The EEC 415 may store location information indicating the location of the EEC 415 in the AC context associated with the AC 410-1 based at least in part on the location of the AC 410-1 being able to be considered the same as the location of the EEC 415.

In some aspects, as shown by reference number 735, the EES 420 may receive an EES registration message from the EEC 415. The EES registration message may indicate a capability of the EEC 415 to act as a gateway UE for external devices behind the EEC 415, a list of addresses of external devices connected to the EEC 415 (e.g., the address of the AC 410-1), and/or location information identifying a location of the external devices.

As shown by reference number 740, the EES 420 may store the address information for the AC 410-1. For example, the EES 420 may store the list of addresses of the external devices connected to the EEC 415 in the EEC context associated with the EEC 415.

In some aspects, as shown by reference number 745, the EES 420 may store location information for the AC 410-1. For example, the EES registration message received from the EEC 415 may include location information indicating a location of the external devices connected to the EEC 415. The EES 420 may store the location information in association with the list of addresses in the EEC context associated with the EEC 415.

As shown by reference number 750, the EES 420 may receive a request for location information of the AC 410-1 (e.g., the UE 120-2) from the EAS 710. In some aspects, the EAS 710 may request a location reporting API over an edge-3 interface to the EES 420. In some aspects, the request for the location information of the AC 410-1 may include the address of the AC 410-1 (e.g., the address of the UE 120-2).

In some aspects, the EES 420 may identify one or more EECs, including the EEC 415, having a capability to act as a gateway UE for external devices behind the EECs based at least in part on an indication of the capability stored in one or more EEC contexts associated with the one or more EECs. The EEC 415 may identify addresses of the external devices connected to the one or more EECs based at least in part on the lists of addresses stored in the one or more EEC contexts. The EEC 415 may search the lists of addresses to identify a list of addresses that includes the address of the AC 410-1. The EEC 415 may determine that the identified list of addresses is associated with the EEC 415 and may determine that the address included in the location request message corresponds to a device connected to the EEC 415, based at least in part on the list of addresses associated with the EEC 415 including the address.

In some aspects, the EEC context associated with the EEC 415 includes the location information indicating the location of the AC 410-1. The EES 420 may determine the location of the AC 410-1 based at least in part on the location information included in the EEC context.

In some aspects, the EEC context associated with the EEC 415 does not include the location information indicating the location of the AC 410-1. In some aspects, the EES 420 may request location information indicating the location of the AC 410-1 from the EEC 415. In some aspects, the location information is stored in the AC context associated with the AC 410-1 and the EEC 415 obtains the location information from the AC context associated with the AC 410-1.

In some aspects, the location information is not stored in the AC context associated with the AC 410-1. In some aspects, the EEC 415 may request the location information from the AC 410-1 based at least in part on the location information not being stored in the AC context associated with the AC 410-1. In some aspects, the EEC 415 may determine that the location of the AC 410-1 can be considered the same as the location of the EEC 415 and may determine the location of the AC 410-1 to correspond to the location of the EEC 415.

As shown by reference number 755, the EES 420 may transmit, and the EAS 710 may receive, the location information for the AC 410-1. For example, the EEC 415 may transmit the location information stored in the AC context associated with the AC 410-1, the location information received from the AC 410-1 in response to a request for the location information transmitted by the EEC 415, or location information indicating the location of the EEC 415.

As indicated above, FIG. 7 is provided as an example. Other examples may differ from what is described with respect to FIG. 7.

Figure 8:
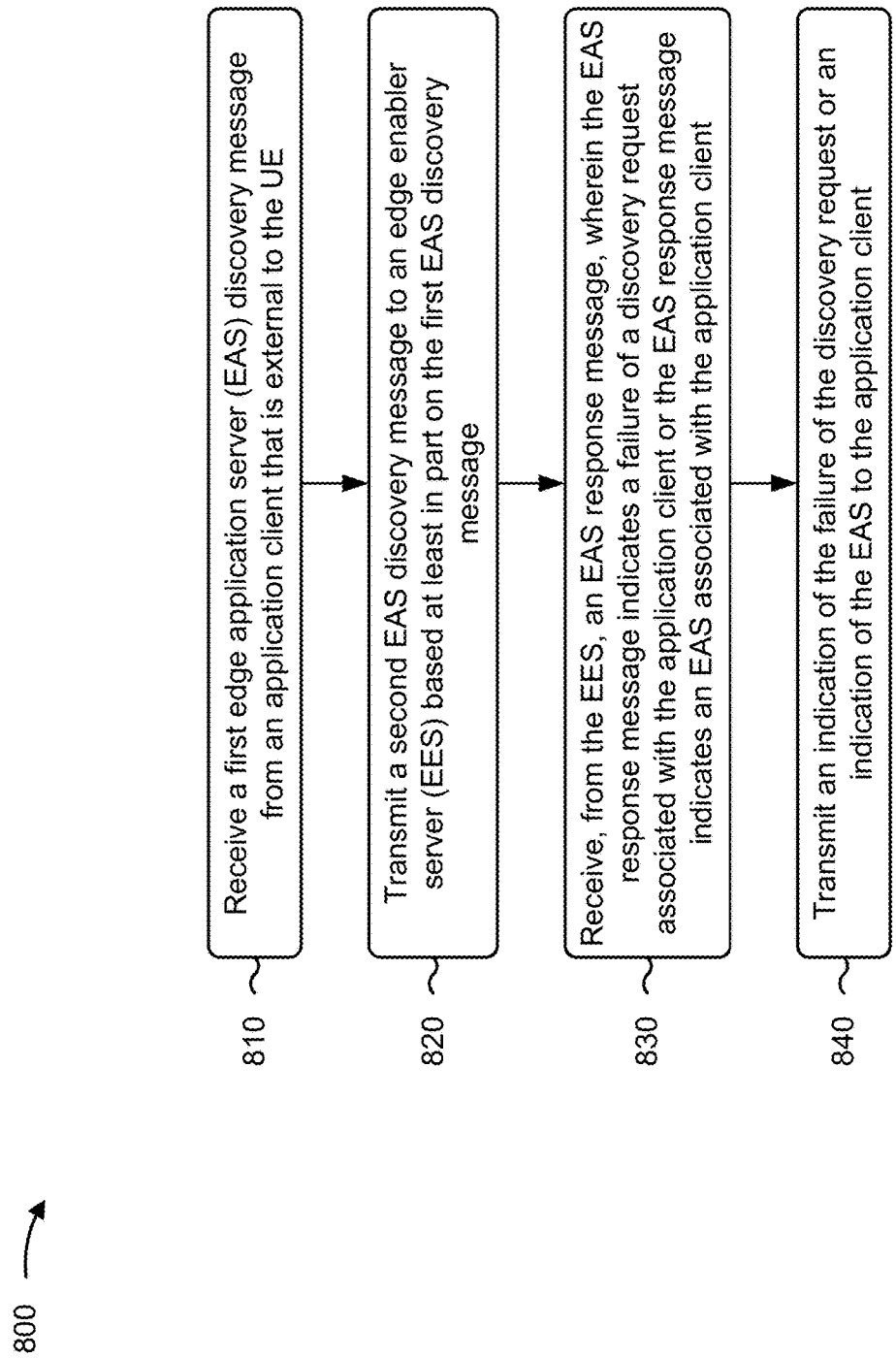
FIGS. 8-11 are diagrams illustrating example processes associated with AC and EAS discovery with service authorization and location service, in accordance with the present disclosure.

FIG. 8 is a diagram illustrating an example process 800 performed, for example, by a UE, in accordance with the present disclosure. Example process 800 is an example where the UE (e.g., UE 120) performs operations associated with AC and EAS discovery with service authorization and location service.

As shown in FIG. 8, in some aspects, process 800 may include receiving a first EAS discovery message from an application client that is external to the UE (block 810). For example, the UE (e.g., using communication manager 140 and/or reception component 1202, depicted in FIG. 12) may receive a first EAS discovery message from an application client that is external to the UE, as described above.

As further shown in FIG. 8, in some aspects, process 800 may include transmitting a second EAS discovery message to an EES based at least in part on the first EAS discovery message (block 820). For example, the UE (e.g., using communication manager 140 and/or transmission component 1204, depicted in FIG. 12) may transmit a second EAS discovery message to an EES based at least in part on the first EAS discovery message, as described above.

As further shown in FIG. 8, in some aspects, process 800 may include receiving, from the EES, an EAS response message, wherein the EAS response message indicates a failure of a discovery request associated with the application client or the EAS response message indicates an EAS associated with the application client (block 830). For example, the UE (e.g., using communication manager 140 and/or reception component 1202, depicted in FIG. 12) may receive, from the EES, an EAS response message, wherein the EAS response message indicates a failure of a discovery request associated with the application client or the EAS response message indicates an EAS associated with the application client, as described above.

As further shown in FIG. 8, in some aspects, process 800 may include transmitting an indication of the failure of the discovery request or an indication of the EAS to the application client (block 840). For example, the UE (e.g., using communication manager 140 and/or transmission component 1204, depicted in FIG. 12) may transmit an indication of the failure of the discovery request or an indication of the EAS to the application client, as described above.

Process 800 may include additional aspects, such as any single aspect or any combination of aspects described below and/or in connection with one or more other processes described elsewhere herein.

In a first aspect, the first EAS discovery message indicates one or more of an application client identifier associated with the application client, a device identifier associated with a device that includes the application client, or an EAS discovery filter.

In a second aspect, alone or in combination with the first aspect, the application client comprises a first application client, and process 800 includes receiving a third EAS discovery message from a second application client, wherein the second EAS discovery message includes first discovery information associated with the first application client and second discovery information associated with the second application client, and wherein the EAS response message indicates the EAS associated with the first application client and a second EAS associated with the second application client.

In a third aspect, alone or in combination with one or more of the first and second aspects, transmitting the indication of the failure of the discovery request or the indication of the EAS to the first application client includes transmitting the indication of the EAS to the first application client and an indication of the second EAS to the second application client.

In a fourth aspect, alone or in combination with one or more of the first through third aspects, the second EAS discovery message includes the first discovery information associated with the first application client and the second discovery information associated with the second application client based at least in part on a difference between a time at which the first EAS discovery message is received and a time at which the third EAS discovery message is received satisfying a threshold.

In a fifth aspect, alone or in combination with one or more of the first through fourth aspects, the second EAS discovery message includes the first discovery information associated with the first application client and the second discovery information associated with the second application client based at least in part on a determination that the first application client and the second application client are located within a pre-defined distance from the UE.

In a sixth aspect, alone or in combination with one or more of the first through fifth aspects, the application client comprises a first application client, and process 800 includes receiving a third EAS discovery message from a second application client, wherein the second EAS discovery message includes first discovery information associated with the first application client and second discovery information associated with the second application client when the first application client and the second application are located within a pre-defined distance from the UE, and wherein the second EAS discovery message includes the first discovery information and a fourth EAS discovery message includes the second discovery information when one or more of the first application client or the second application client are not located within the pre-defined distance from the UE, and transmitting one or more of the second EAS discovery message or the fourth EAS discovery message to the EES based at least in part on whether one or more of the first application client or the second application client are located within the pre-defined distance from the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
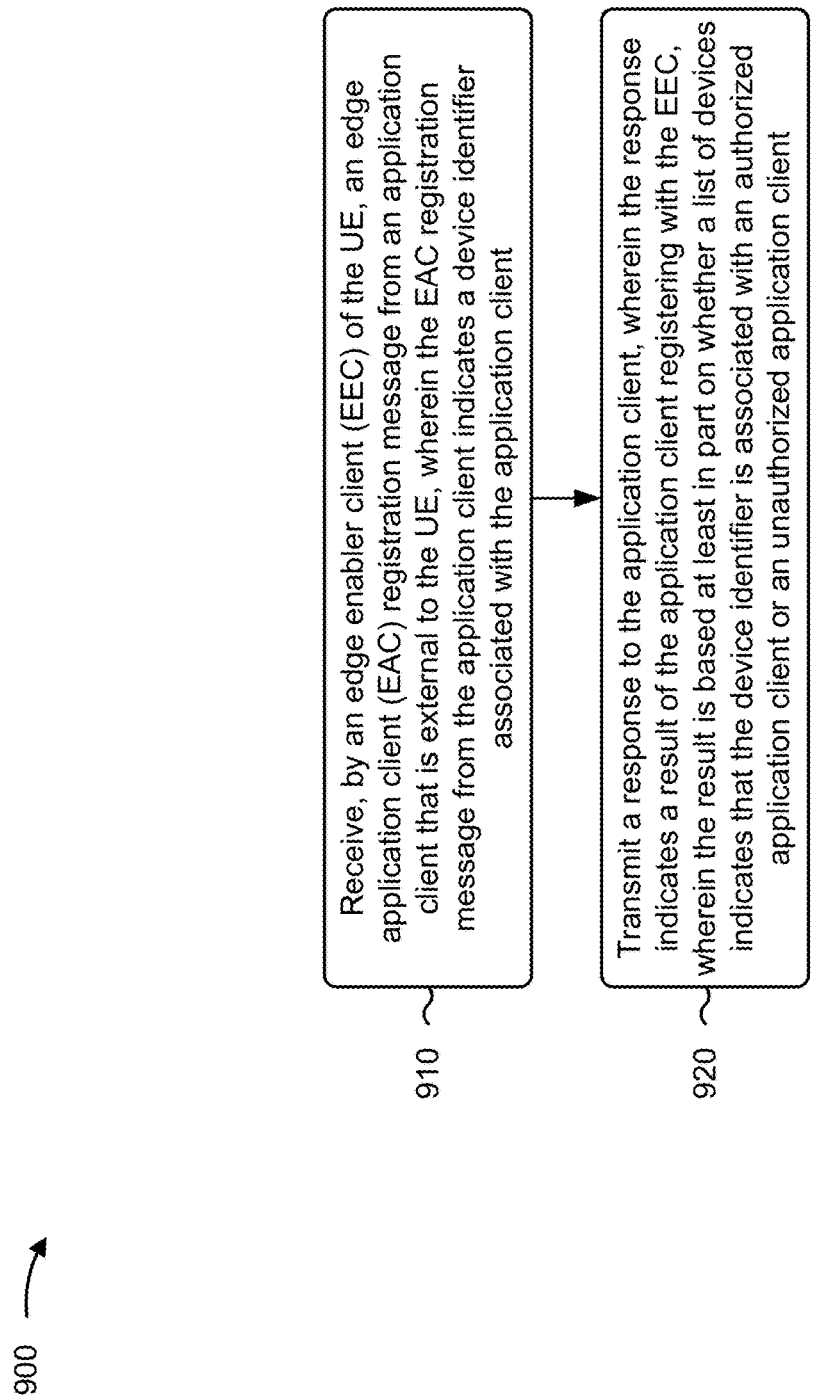

FIG. 9 is a diagram illustrating an example process 900 performed, for example, by a UE, in accordance with the present disclosure. Example process 900 is an example where the UE (e.g., UE 120) performs operations associated with AC and EAS discovery with service authorization and location service.

As shown in FIG. 9, in some aspects, process 900 may include receiving an EAC registration message from an application client that is external to the UE, wherein the EAC registration message from the application client indicates a device identifier associated with the application client (block 910). For example, the UE (e.g., using communication manager 140 and/or reception component 1302, depicted in FIG. 13) may receive an EAC registration message from an application client that is external to the UE, wherein the EAC registration message from the application client indicates a device identifier associated with the application client, as described above.

As further shown in FIG. 9, in some aspects, process 900 may include transmitting a response to the application client, wherein the response indicates a result of the application client registering with the EEC, wherein the result is based at least in part on whether a list of devices indicates that the device identifier is associated with an authorized application client or an unauthorized application client (block 920). For example, the UE (e.g., using communication manager 140 and/or transmission component 1304, depicted in FIG. 13) may transmit a response to the application client, wherein the response indicates a result of the application client registering with the EEC, wherein the result is based at least in part on whether a list of devices indicates that the device identifier is associated with an authorized application client or an unauthorized application client, as described above.

Process 900 may include additional aspects, such as any single aspect or any combination of aspects described below and/or in connection with one or more other processes described elsewhere herein.

In a first aspect, process 900 includes receiving the list of devices based at least in part on performing service provisioning to an ECS.

In a second aspect, alone or in combination with the first aspect, process 900 includes receiving the list of devices based at least in part on registering with an EES.

In a third aspect, alone or in combination with one or more of the first and second aspects, process 900 includes transmitting an EAS discovery message that indicates the device identifier to an EES, and receiving an EAS discovery response message, wherein the EAS discovery response message indicates an EAS, wherein the EEC determines whether the application client corresponds to the authorized application client or the unauthorized application client based at least in part on an application client profile associated with the application client and an EAS profile associated with the EAS, wherein the application client profile is included in the EAC registration message or an EAS discovery request received from the application client.

In a fourth aspect, alone or in combination with one or more of the first through third aspects, the EEC determines whether the application client corresponds to the authorized application client or the unauthorized application client based at least in part on one or more of whether the application client and the EAS are associated with a same EAS provider, or whether the application client is located within a valid service area associated with the EAS.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
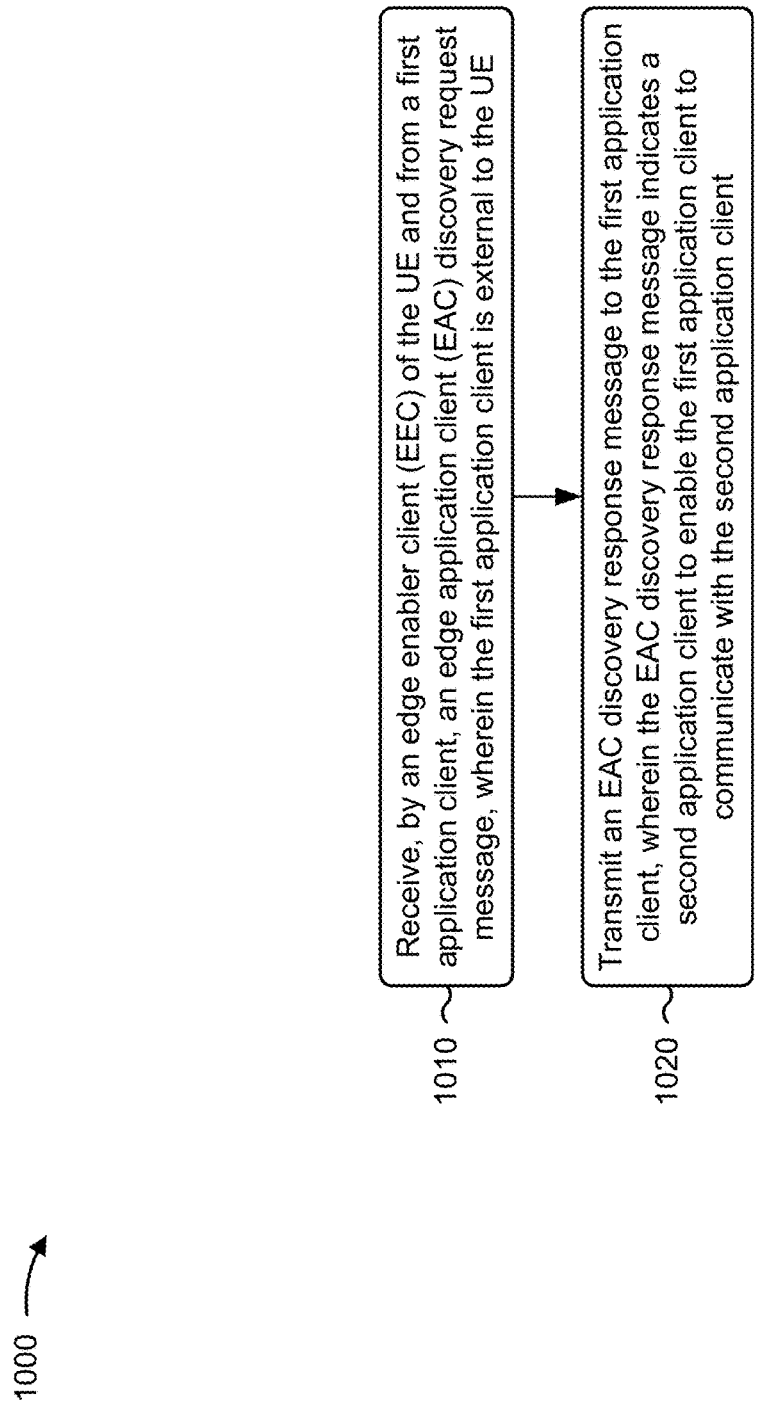

FIG. 10 is a diagram illustrating an example process 1000 performed, for example, by a UE, in accordance with the present disclosure. Example process 1000 is an example where the UE (e.g., UE 120) performs operations associated with AC and EAS discovery with service authorization and location service.

As shown in FIG. 10, in some aspects, process 1000 may include receiving, from a first application client, an EAC discovery request message, wherein the first application client is external to the UE (block 1010). For example, the UE (e.g., using communication manager 140 and/or reception component 1402, depicted in FIG. 14) may receive, from a first application client, an EAC discovery request message, wherein the first application client is external to the UE, as described above.

As further shown in FIG. 10, in some aspects, process 1000 may include transmitting an EAC discovery response message to the first application client, wherein the EAC discovery response message indicates a second application client to enable the first application client to communicate with the second application client (block 1020). For example, the UE (e.g., using communication manager 140 and/or transmission component 1404, depicted in FIG. 14) may transmit an EAC discovery response message to the first application client, wherein the EAC discovery response message indicates a second application client to enable the first application client to communicate with the second application client, as described above.

Process 1000 may include additional aspects, such as any single aspect or any combination of aspects described below and/or in connection with one or more other processes described elsewhere herein.

In a first aspect, the EAC discovery request message indicates an application client identifier associated with the first application client and an application client discovery filter, and the EEC determines the second application client based at least in part on the application client discovery filter.

In a second aspect, alone or in combination with the first aspect, the application client discovery filter indicates one or more of an application client type, a service type, or a service provider identifier.

In a third aspect, alone or in combination with one or more of the first and second aspects, the EAC discovery request message indicates one or more of an application client identifier associated with the second application client, an application type associated with the second application client, endpoint information associated with the second application client, or service information associated with the second application client.

In a fourth aspect, alone or in combination with one or more of the first through third aspects, process 1000 includes receiving an EAC registration request from the second application client, wherein the EAC registration request includes an application client profile associated with the second application client, and wherein the application client profile indicates one or more characteristics of the second application client that are associated with one or more requested characteristics indicated in the EAC discovery request message.

In a fifth aspect, alone or in combination with one or more of the first through fourth aspects, the one or more characteristics of the second application client include one or more of an application client identifier associated with the second application client, an application client type associated with the second application client, endpoint information associated with the second application client, service information associated with the second application client, an EAS characteristic associated with the second application client, or an indication that application discovery is enabled for the second application client.

In a sixth aspect, alone or in combination with one or more of the first through fifth aspects, the EAC discovery request message causes the first application client to be subscribed to the EEC for discovery of other application clients, and the EAC discovery response message is transmitted based at least in part on the second application client registering with the EEC.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
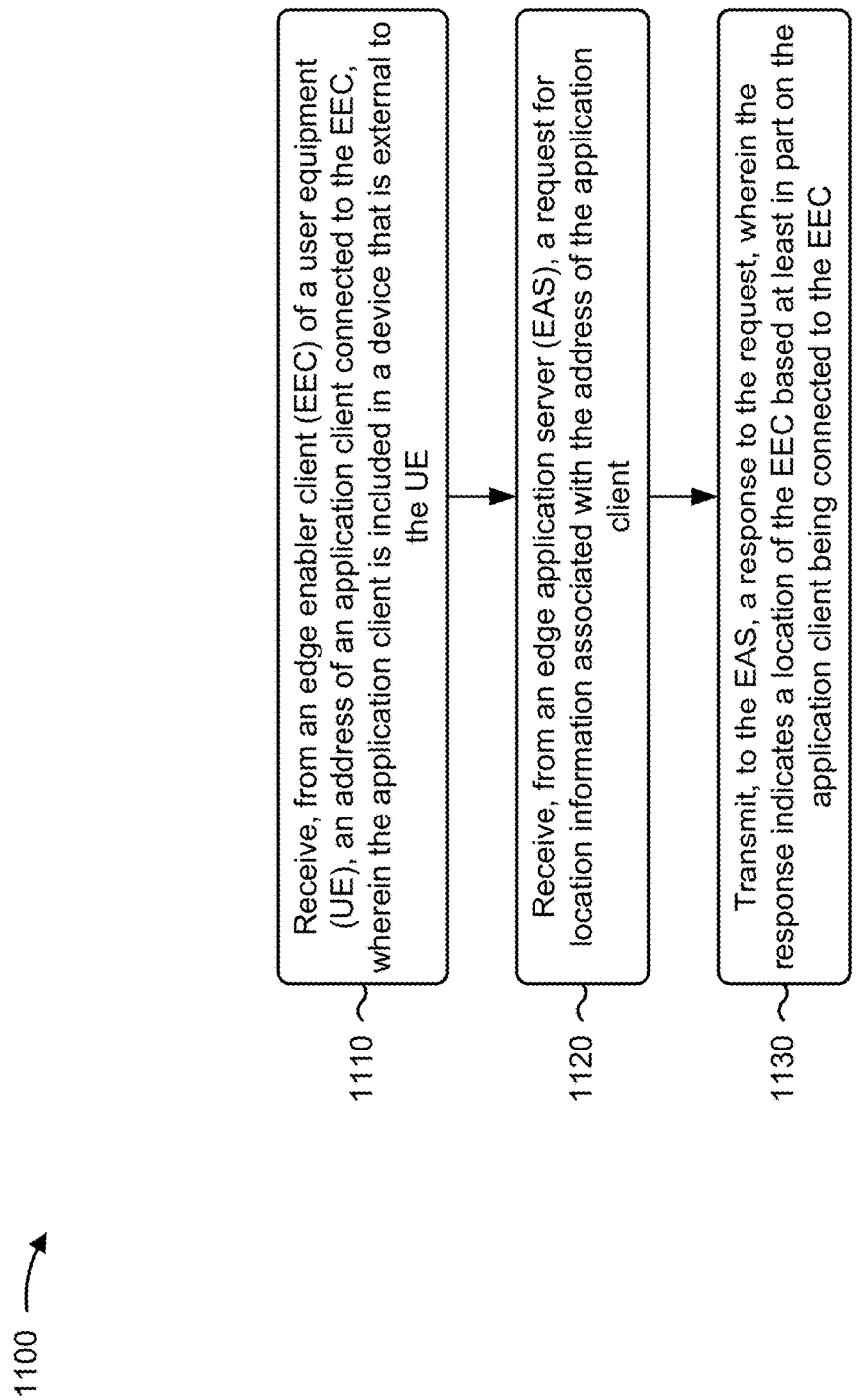

FIG. 11 is a diagram illustrating an example process 1100 performed, for example, by an apparatus of a wireless node, in accordance with the present disclosure. Example process 1100 is an example where the apparatus of the wireless node (e.g., an apparatus of EES 420) performs operations associated with AC and EAS discovery with service authorization and location service.

As shown in FIG. 11, in some aspects, process 1100 may include receiving, from an EEC of a UE, an address of an application client connected to the EEC, wherein the application client is included in a device that is external to the UE (block 1110). For example, the apparatus (e.g., using communication manager 160 and/or reception component 1502, depicted in FIG. 15) may receive, from an EEC of a UE, an address of an application client connected to the EEC, wherein the application client is included in a device that is external to the UE, as described above.

As further shown in FIG. 11, in some aspects, process 1100 may include receiving, from an EAS, a request for location information associated with the address of the application client (block 1120). For example, the apparatus (e.g., using communication manager 160 and/or reception component 1502, depicted in FIG. 15) may receive, from an EAS, a request for location information associated with the address of the application client, as described above.

As further shown in FIG. 11, in some aspects, process 1100 may include transmitting, to the EAS, a response to the request, wherein the response indicates a location of the EEC based at least in part on the application client being connected to the EEC (block 1130). For example, the apparatus (e.g., using communication manager 160 and/or transmission component 1504, depicted in FIG. 15) may transmit, to the EAS, a response to the request, wherein the response indicates a location of the EEC based at least in part on the application client being connected to the EEC, as described above.

Process 1100 may include additional aspects, such as any single aspect or any combination of aspects described below and/or in connection with one or more other processes described elsewhere herein.

In a first aspect, the apparatus comprises an EES.

In a second aspect, alone or in combination with the first aspect, process 1100 includes receiving, from the EEC, an indication that the EEC acts as a gateway UE for external devices connected to the UE, wherein the apparatus identifies the EEC as a candidate EEC for being connected to a device associated with the addresses based at least in part on the indication.

In a third aspect, alone or in combination with one or more of the first and second aspects, the apparatus comprises an EES, and the indication is included in an EEC registration request message transmitted by the EEC to the EES.

In a fourth aspect, alone or in combination with one or more of the first through third aspects, the apparatus comprises an EES, and wherein the address is included in a list of addresses included in an EEC registration request message transmitted by the EEC to the EES.

In a fifth aspect, alone or in combination with one or more of the first through fourth aspects, process 1100 includes receiving, from the EEC, location information associated with the application client, wherein the apparatus associates the location information with the address based at least in part on receiving the location information from the EEC, and wherein the response to the request includes the location information associated with the application client based at least in part on the location information being associated with the address.

In a sixth aspect, alone or in combination with one or more of the first through fifth aspects, the apparatus triggers a location reporting application program interface (API) to determine the location of the UE.

In a seventh aspect, alone or in combination with one or more of the first through sixth aspects, the location reporting API comprises a network exposure function (NEF) API.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
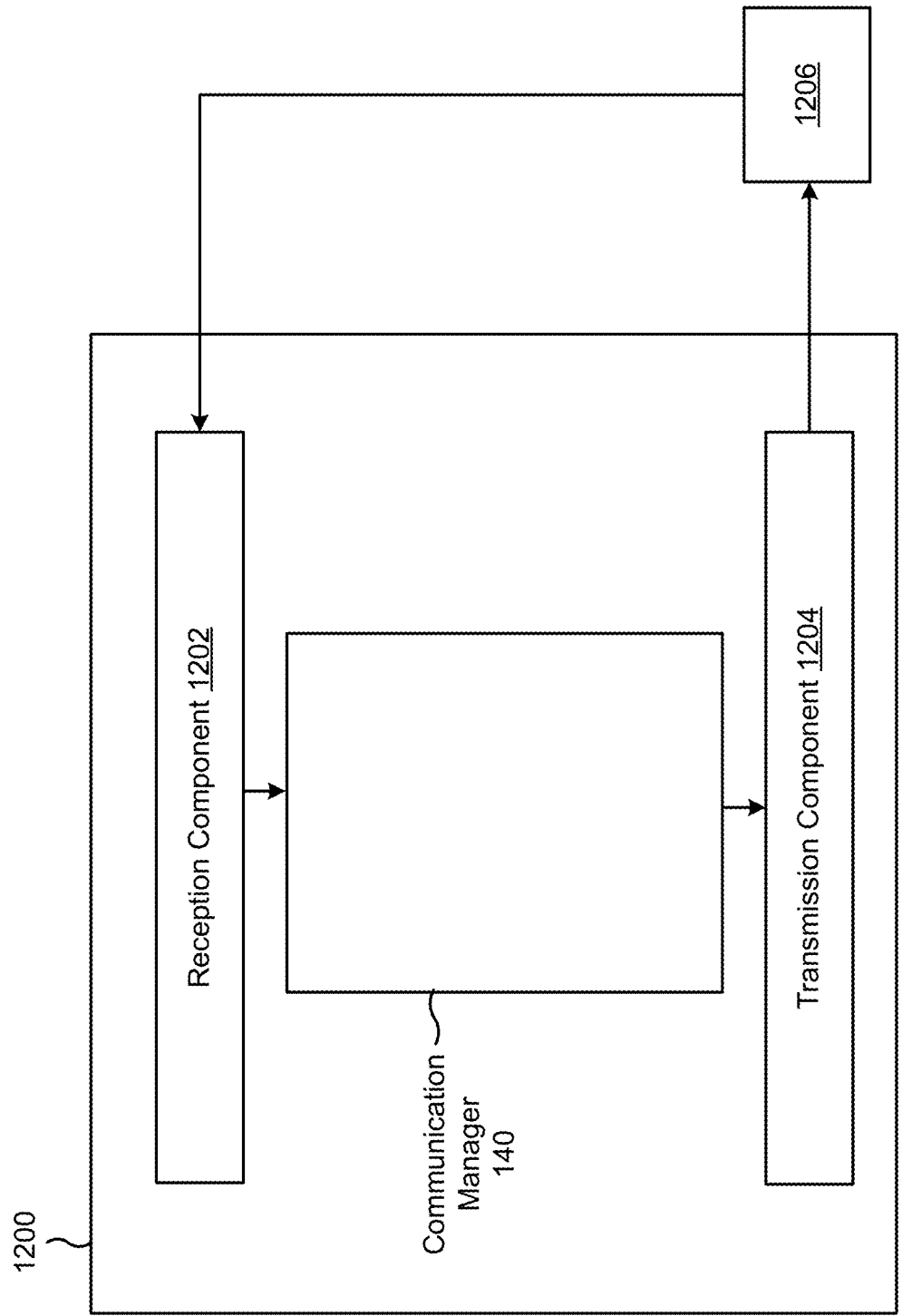
FIGS. 12-15 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140.

In some aspects, the apparatus 1200 may be configured to perform one or more operations described herein in connection with FIG. 4. Additionally, or alternatively, the apparatus 1200 may be configured to perform one or more processes described herein, such as process 800 of FIG. 8. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive a first EAS discovery message from an application client that is external to the UE. The transmission component 1204 may transmit a second EAS discovery message to an EES based at least in part on the first EAS discovery message. The reception component 1202 may receive, from the EES, an EAS response message, wherein the EAS response message indicates a failure of a discovery request associated with the application client or the EAS response message indicates an EAS associated with the application client. The transmission component 1204 may transmit an indication of the failure of the discovery request or an indication of the EAS to the application client.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
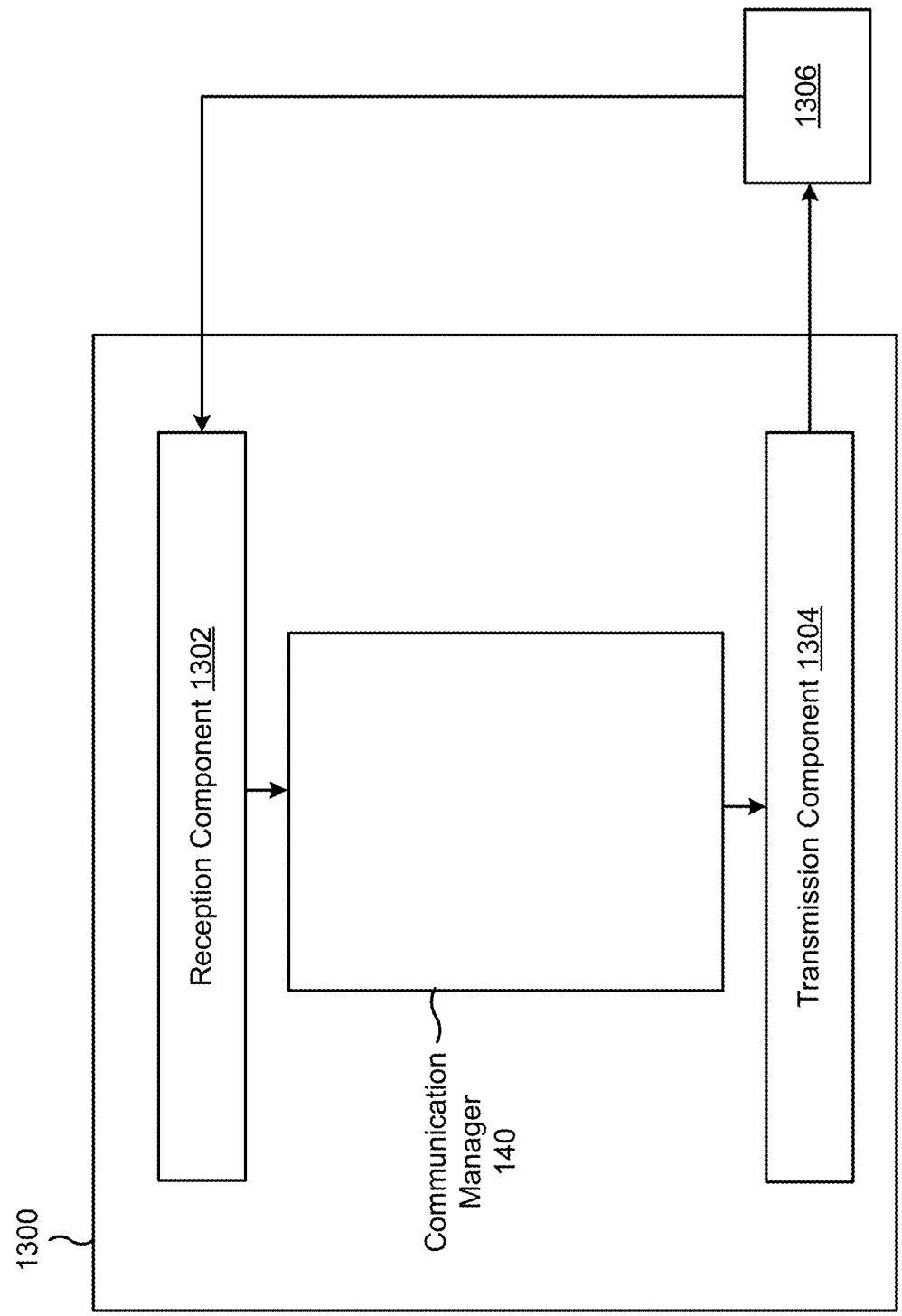

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140.

In some aspects, the apparatus 1300 may be configured to perform one or more operations described herein in connection with FIGS. 5A and 5B. Additionally, or alternatively, the apparatus 1300 may be configured to perform one or more processes described herein, such as process 900 of FIG. 9. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive an EAC registration message from an application client that is external to the UE, wherein the EAC registration message from the application client indicates a device identifier associated with the application client. The transmission component 1304 may transmit a response to the application client, wherein the response indicates a result of the application client registering with the EEC, wherein the result is based at least in part on whether a list of devices indicates that the device identifier is associated with an authorized application client or an unauthorized application client.

The reception component 1302 may receive the list of devices based at least in part on performing service provisioning to an ECS.

The reception component 1302 may receive the list of devices based at least in part on registering with an EES.

The transmission component 1304 may transmit an EAS discovery message that indicates the device identifier to an EES.

The reception component 1302 may receive an EAS discovery response message, wherein the EAS discovery response message indicates an EAS, wherein the EEC determines whether the application client corresponds to the authorized application client or the unauthorized application client based at least in part on an application client profile associated with the application client and an EAS profile associated with the EAS, wherein the application client profile is included in the EAC registration message or an EAS discovery request received from the application client.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
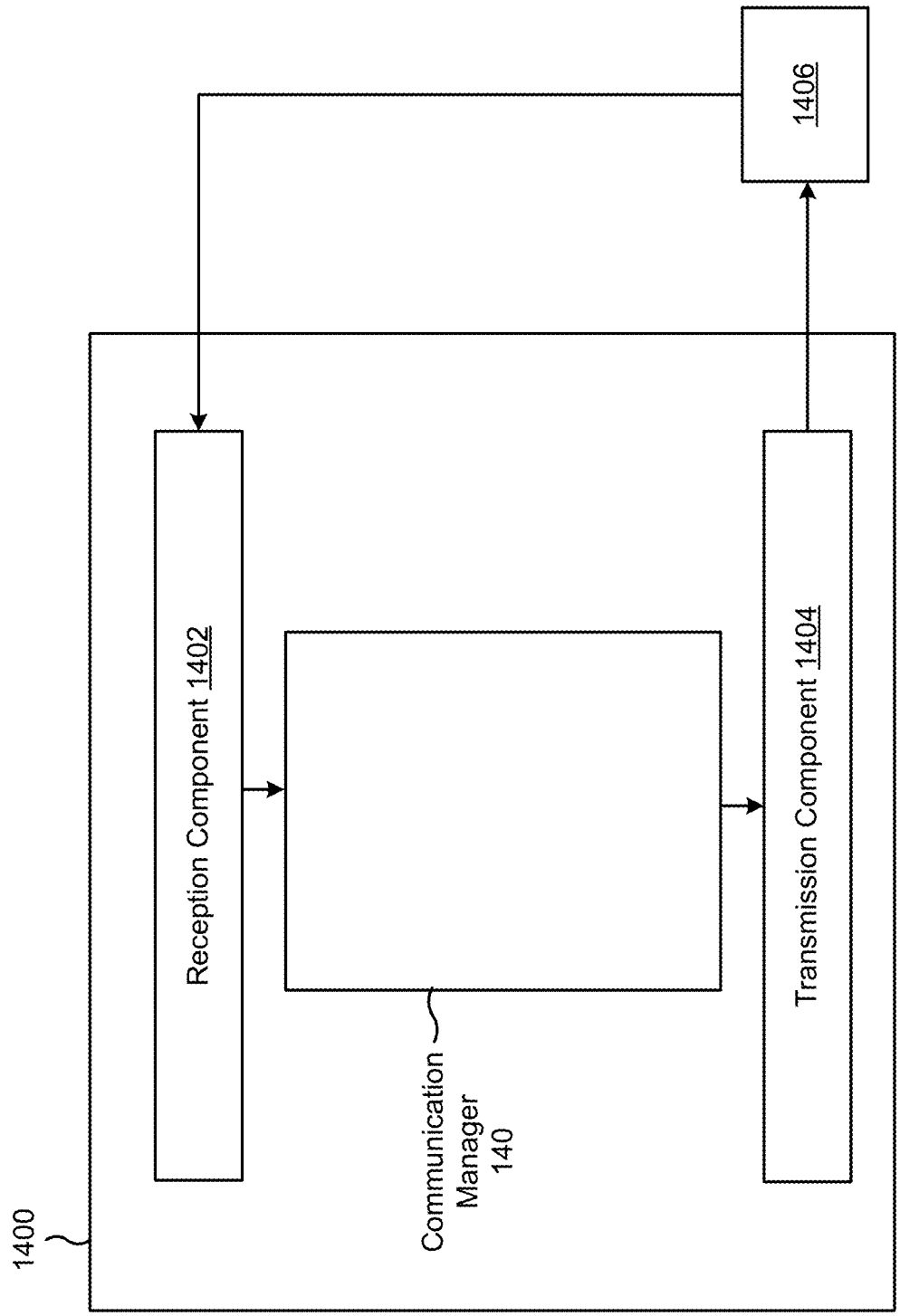

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140.

In some aspects, the apparatus 1400 may be configured to perform one or more operations described herein in connection with FIGS. 6A and 6B. Additionally, or alternatively, the apparatus 1400 may be configured to perform one or more processes described herein, such as process 1000 of FIG. 10. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The reception component 1402 may receive, from a first application client, an EAC discovery request message, wherein the first application client is external to the UE. The transmission component 1404 may transmit an EAC discovery response message to the first application client, wherein the EAC discovery response message indicates a second application client to enable the first application client to communicate with the second application client.

The reception component 1402 may receive an EAC registration request from the second application client, wherein the EAC registration request includes an application client profile associated with the second application client, and wherein the application client profile indicates one or more characteristics of the second application client that are associated with one or more requested characteristics indicated in the EAC discovery request message.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
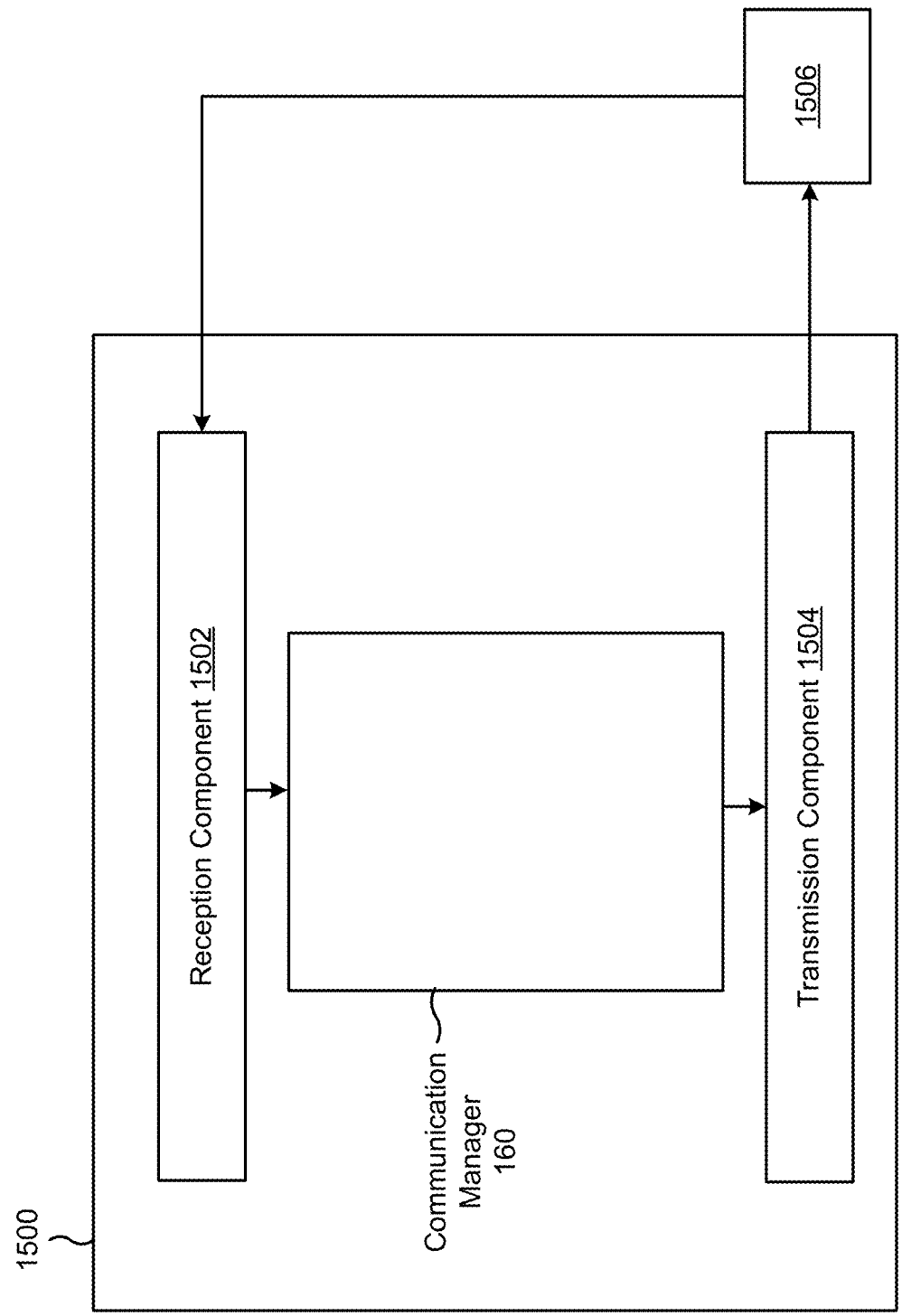

FIG. 15 is a diagram of an example apparatus 1500 for wireless communication. The apparatus 1500 may be a edge network device, or a edge network device may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 160.

In some aspects, the apparatus 1500 may be configured to perform one or more operations described herein in connection with FIG. 7. Additionally, or alternatively, the apparatus 1500 may be configured to perform one or more processes described herein, such as process 1100 of FIG. 11. In some aspects, the apparatus 1500 and/or one or more components shown in FIG. 15 may include one or more components of the edge network device described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the edge network device described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the edge network device described in connection with FIG. 2. In some aspects, the transmission component 1504 may be co-located with the reception component 1502 in a transceiver.

The reception component 1502 may receive, from an EEC of a UE, an address of an application client connected to the EEC, wherein the application client is included in a device that is external to the UE. The reception component 1502 may receive, from an EAS, a request for location information associated with the address of the application client. The transmission component 1504 may transmit, to the EAS, a response to the request, wherein the response indicates a location of the EEC based at least in part on the application client being connected to the EEC.

The reception component 1502 may receive, from the EEC, an indication that the EEC acts as a gateway UE for external devices connected to the UE, wherein the apparatus identifies the EEC as a candidate EEC for being connected to a device associated with the addresses based at least in part on the indication.

The reception component 1502 may receive, from the EEC, location information associated with the application client, wherein the apparatus associates the location information with the address based at least in part on receiving the location information from the EEC, and wherein the response to the request includes the location information associated with the application client based at least in part on the location information being associated with the address.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a UE, comprising: receiving a first EAS discovery message from an application client that is external to the UE; transmitting a second EAS discovery message to an EES based at least in part on the first EAS discovery message; receiving, from the EES, an EAS response message, wherein the EAS response message indicates a failure of a discovery request associated with the application client or the EAS response message indicates an EAS associated with the application client; and transmitting an indication of the failure of the discovery request or an indication of the EAS to the application client.

Aspect 2: The method of Aspect 1, wherein the first EAS discovery message indicates one or more of an application client identifier associated with the application client, a device identifier associated with a device that includes the application client, or an EAS discovery filter.

Aspect 3: The method of one or more of Aspects 1 and 2, wherein the application client comprises a first application client, and wherein the method further comprises: receiving a third EAS discovery message from a second application client, wherein the second EAS discovery message includes first discovery information associated with the first application client and second discovery information associated with the second application client, and wherein the EAS response message indicates the EAS associated with the first application client and a second EAS associated with the second application client.

Aspect 4: The method of Aspect 3, wherein transmitting the indication of the failure of the discovery request or the indication of the EAS to the first application client includes: transmitting the indication of the EAS to the first application client and an indication of the second EAS to the second application client.

Aspect 5: The method of Aspect 3, wherein the second EAS discovery message includes the first discovery information associated with the first application client and the second discovery information associated with the second application client based at least in part on a difference between a time at which the first EAS discovery message is received and a time at which the third EAS discovery message is received satisfying a threshold.

Aspect 6: The method of Aspect 3, wherein the second EAS discovery message includes the first discovery information associated with the first application client and the second discovery information associated with the second application client based at least in part on a determination that the first application client and the second application client are located within a pre-defined distance from the UE.

Aspect 7: The method of one or more of Aspects 1 through 6, wherein the application client comprises a first application client, and wherein the method further comprises: receiving a third EAS discovery message from a second application client, wherein the second EAS discovery message includes first discovery information associated with the first application client and second discovery information associated with the second application client when the first application client and the second application are located within a pre-defined distance from the UE, and wherein the second EAS discovery message includes the first discovery information and a fourth EAS discovery message includes the second discovery information when one or more of the first application client or the second application client are not located within the pre-defined distance from the UE; and transmitting one or more of the second EAS discovery message or the fourth EAS discovery message to the EES based at least in part on whether one or more of the first application client or the second application client are located within the pre-defined distance from the UE.

Aspect 8: A method of wireless communication performed by a UE, comprising: receiving, by an EEC of the UE, an EAC registration message from an application client that is external to the UE, wherein the EAC registration message from the application client indicates a device identifier associated with the application client; and transmitting a response to the application client, wherein the response indicates a result of the application client registering with the EEC, wherein the result is based at least in part on whether a list of devices indicates that the device identifier is associated with an authorized application client or an unauthorized application client.

Aspect 9: The method of Aspect 8, further comprising: receiving the list of devices based at least in part on performing service provisioning to an ECS.

Aspect 10: The method of one or more of Aspects 8 and 9, further comprising: receiving the list of devices based at least in part on registering with an EES.

Aspect 11: The method of one or more of Aspects 8 through 10, further comprising: transmitting an EAS discovery message that indicates the device identifier to an EES; and receiving an EAS discovery response message, wherein the EAS discovery response message indicates an EAS, wherein the EEC determines whether the application client corresponds to the authorized application client or the unauthorized application client based at least in part on an application client profile associated with the application client and an EAS profile associated with the EAS, wherein the application client profile is included in the EAC registration message or an EAS discovery request received from the application client.

Aspect 12: The method of Aspect 11, wherein the EEC determines whether the application client corresponds to the authorized application client or the unauthorized application client based at least in part on one or more of: whether the application client and the EAS are associated with a same EAS provider, or whether the application client is located within a valid service area associated with the EAS.

Aspect 13: A method of wireless communication performed by a UE, comprising: receiving, by an EEC of the UE and from a first application client, an EAC discovery request message, wherein the first application client is external to the UE; and transmitting an EAC discovery response message to the first application client, wherein the EAC discovery response message indicates a second application client to enable the first application client to communicate with the second application client.

Aspect 14: The method of Aspect 13, wherein the EAC discovery request message indicates an application client identifier associated with the first application client and an application client discovery filter, and wherein the EEC determines the second application client based at least in part on the application client discovery filter.

Aspect 15: The method of one or more of Aspects 13 and 14, wherein the application client discovery filter indicates one or more of an application client type, a service type, or a service provider identifier.

Aspect 16: The method of one or more of Aspects 13 through 15, wherein EAC discovery request message indicates one or more of: an application client identifier associated with the second application client, an application type associated with the second application client, endpoint information associated with the second application client, or service information associated with the second application client.

Aspect 17: The method of one or more of Aspects 13 through 16, further comprising: receiving an EAC registration request from the second application client, wherein the EAC registration request includes an application client profile associated with the second application client, and wherein the application client profile indicates one or more characteristics of the second application client that are associated with one or more requested characteristics indicated in the EAC discovery request message.

Aspect 18: The method of Aspect 17, wherein the one or more characteristics of the second application client include one or more of an application client identifier associated with the second application client, an application client type associated with the second application client, endpoint information associated with the second application client, service information associated with the second application client, an EAS characteristic associated with the second application client, or an indication that application discovery is enabled for the second application client.

Aspect 19: The method of Aspect 17, wherein the EAC discovery request message causes the first application client to be subscribed to the EEC for discovery of other application clients, and wherein the EAC discovery response message is transmitted based at least in part on the second application client registering with the EEC.

Aspect 20: A method of wireless communication performed by an apparatus of a wireless node, comprising: receiving, from an EEC of a UE, an address of an application client connected to the EEC, wherein the application client is included in a device that is external to the UE; receiving, from an EAS, a request for location information associated with the address of the application client; and transmitting, to the EAS, a response to the request, wherein the response indicates a location of the EEC based at least in part on the application client being connected to the EEC.

Aspect 21: The method of Aspect 20, wherein the apparatus comprises an EES.

Aspect 22: The method of one or more of Aspects 20 and 21, further comprising: receiving, from the EEC, an indication that the EEC acts as a gateway UE for external devices connected to the UE, wherein the apparatus identifies the EEC as a candidate EEC for being connected to a device associated with the addresses based at least in part on the indication.

Aspect 23: The method of Aspect 22, wherein the apparatus comprises an EES, and wherein the indication is included in an EEC registration request message transmitted by the EEC to the EES.

Aspect 24: The method of one or more of Aspects 20 through 23, wherein the apparatus comprises an EES, and wherein the address is included in a list of addresses included in an EEC registration request message transmitted by the EEC to the EES.

Aspect 25: The method of one or more of Aspects 20 through 24, further comprising: receiving, from the EEC, location information associated with the application client, wherein the apparatus associates the location information with the address based at least in part on receiving the location information from the EEC, and wherein the response to the request includes the location information associated with the application client based at least in part on the location information being associated with the address.

Aspect 26: The method of one or more of Aspects 20 through 25, wherein the apparatus triggers a location reporting API to determine the location of the UE.

Aspect 27: The method of Aspect 26, wherein the location reporting API comprises an NEF API.

Aspect 28: An apparatus for wireless communication at a device, comprising a processor; memory coupled with the processor; and instructions stored in the memory and executable by the processor to cause the apparatus to perform the method of one or more of Aspects 1 through 7.

Aspect 29: A device for wireless communication, comprising a memory and one or more processors coupled to the memory, the one or more processors configured to perform the method of one or more of Aspects 1 through 7.

Aspect 30: An apparatus for wireless communication, comprising at least one means for performing the method of one or more of Aspects 1 through 7.

Aspect 31: A non-transitory computer-readable medium storing code for wireless communication, the code comprising instructions executable by a processor to perform the method of one or more of Aspects 1 through 7.

Aspect 32: A non-transitory computer-readable medium storing a set of instructions for wireless communication, the set of instructions comprising one or more instructions that, when executed by one or more processors of a device, cause the device to perform the method of one or more of Aspects 1 through 7.

Aspect 33: An apparatus for wireless communication at a device, comprising a processor; memory coupled with the processor; and instructions stored in the memory and executable by the processor to cause the apparatus to perform the method of one or more of Aspects 8 through 12.

Aspect 34: A device for wireless communication, comprising a memory and one or more processors coupled to the memory, the one or more processors configured to perform the method of one or more of Aspects 8 through 12.

Aspect 35: An apparatus for wireless communication, comprising at least one means for performing the method of one or more of Aspects 8 through 12.

Aspect 36: A non-transitory computer-readable medium storing code for wireless communication, the code comprising instructions executable by a processor to perform the method of one or more of Aspects 8 through 12.

Aspect 37: A non-transitory computer-readable medium storing a set of instructions for wireless communication, the set of instructions comprising one or more instructions that, when executed by one or more processors of a device, cause the device to perform the method of one or more of Aspects 8 through 12.

Aspect 38: An apparatus for wireless communication at a device, comprising a processor; memory coupled with the processor; and instructions stored in the memory and executable by the processor to cause the apparatus to perform the method of one or more of Aspects 13 through 19.

Aspect 39: A device for wireless communication, comprising a memory and one or more processors coupled to the memory, the one or more processors configured to perform the method of one or more of Aspects 13 through 19.

Aspect 40: An apparatus for wireless communication, comprising at least one means for performing the method of one or more of Aspects 13 through 19.

Aspect 41: A non-transitory computer-readable medium storing code for wireless communication, the code comprising instructions executable by a processor to perform the method of one or more of Aspects 13 through 19.

Aspect 42: A non-transitory computer-readable medium storing a set of instructions for wireless communication, the set of instructions comprising one or more instructions that, when executed by one or more processors of a device, cause the device to perform the method of one or more of Aspects 13 through 19.

Aspect 43: An apparatus for wireless communication at a device, comprising a processor; memory coupled with the processor; and instructions stored in the memory and executable by the processor to cause the apparatus to perform the method of one or more of Aspects 20 through 27.

Aspect 44: A device for wireless communication, comprising a memory and one or more processors coupled to the memory, the one or more processors configured to perform the method of one or more of Aspects 20 through 27.

Aspect 44: An apparatus for wireless communication, comprising at least one means for performing the method of one or more of Aspects 20 through 27.

Aspect 46: A non-transitory computer-readable medium storing code for wireless communication, the code comprising instructions executable by a processor to perform the method of one or more of Aspects 20 through 27.

Aspect 47: A non-transitory computer-readable medium storing a set of instructions for wireless communication, the set of instructions comprising one or more instructions that, when executed by one or more processors of a device, cause the device to perform the method of one or more of Aspects 20 through 27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
transmit an edge application server (EAS) discovery request to an edge enabler server (EES), wherein the EAS discovery request includes first discovery information associated with a first application client that is external to the UE and includes second discovery information associated with a second application client;
  receive, from the EES, an EAS response message, wherein:
    the EAS response message indicates a failure of a discovery request associated with the first application client, or
    the EAS response message indicates a first EAS associated with the first application client and a second EAS associated with the second application client; and
  transmit an indication of the failure of the discovery request or an indication of the first EAS to the first application client.

2. The UE of claim 1, wherein the first discovery information comprises one or more of:
  an EAS discovery filter,
  a category associated with the first application client, or
  a service key performance indicator associated with the first application client.

3. The UE of claim 1, wherein the one or more processors are further configured to:
  transmit an indication of the second EAS to the second application client.

4. The UE of claim 1, wherein the EAS discovery request further includes one or more of:
  a device identifier associated with the UE,
  a location of the UE,
  a service area associated with the UE,
  an expected location of the UE, or
  an expected route of the UE.

5. The UE of claim 1, wherein the EAS response message includes one or more of:
  endpoint information associated with the first EAS, or
  a list of EASs that comprises the first EAS and the second EAS.

6. The UE of claim 1, wherein the EAS response message includes a first EAS identifier associated with the first EAS and a second EAS identifier associated with the second EAS.

7. The UE of claim 1, wherein the one or more processors are further configured to:
  perform a registration procedure with the EES, wherein transmission of the EAS discovery request is based at least in part on the registration procedure.

8. A method for wireless communications at a user equipment (UE), comprising:
  transmitting an edge application server (EAS) discovery request to an edge enabler server (EES), wherein the EAS discovery request includes first discovery information associated with a first application client that is external to the UE and includes second discovery information associated with a second application client;
  receiving, from the EES, an EAS response message, wherein:
    the EAS response message indicates a failure of a discovery request associated with the first application client, or
    the EAS response message indicates a first EAS associated with the first application client and a second EAS associated with the second application client; and
  transmitting an indication of the failure of the discovery request or an indication of the first EAS to the first application client.

9. The method of claim 8, wherein the first discovery information comprises one or more of:
  an EAS discovery filter,
  a category associated with the first application client, or
  a service key performance indicator associated with the first application client.

10. The method of claim 8, further comprising:
  transmitting an indication of the second EAS to the second application client.

11. The method of claim 8, wherein the EAS discovery request further includes one or more of:
  a device identifier associated with the UE,
  a location of the UE,
  a service area associated with the UE,
  an expected location of the UE, or
  an expected route of the UE.

12. The method of claim 8, wherein the EAS response message includes one or more of:
  endpoint information associated with the first EAS, or
  a list of EASs that comprises the first EAS and the second EAS.

13. The method of claim 8, wherein the EAS response message includes a first EAS identifier associated with the first EAS and a second EAS identifier associated with the second EAS.

14. The method of claim 8, further comprising:
  performing a registration procedure with the EES, wherein transmission of the EAS discovery request is based at least in part on the registration procedure.

15. An apparatus for wireless communication, comprising:
  means for transmitting an edge application server (EAS) discovery request to an edge enabler server (EES), wherein the EAS discovery request includes first discovery information associated with a first application client that is external to the apparatus and includes second discovery information associated with a second application client;
  means for receiving, from the EES, an EAS response message, wherein:
    the EAS response message indicates a failure of a discovery request associated with the first application client, or
    the EAS response message indicates a first EAS associated with the first application client and a second EAS associated with the second application client; and
  means for transmitting an indication of the failure of the discovery request or an indication of the first EAS to the first application client.

16. The apparatus of claim 15, wherein the first discovery information comprises one or more of:
  an EAS discovery filter,
  a category associated with the first application client, or
  a service key performance indicator associated with the first application client.

17. The apparatus of claim 15, further comprising:
  means for transmitting an indication of the second EAS to the second application client.

18. The apparatus of claim 15, wherein the EAS discovery request further includes one or more of:
  a device identifier associated with the apparatus,
  a location of the apparatus,
  a service area associated with the apparatus,
  an expected location of the apparatus, or
  an expected route of the apparatus.

19. The apparatus of claim 15, wherein the EAS response message includes one or more of:
  endpoint information associated with the first EAS, or
  a list of EASs that comprises the first EAS and the second EAS.

20. The apparatus of claim 15, wherein the EAS response message includes a first EAS identifier associated with the first EAS and a second EAS identifier associated with the second EAS.

* * * * *